US009701293B2

(12) United States Patent
D'Aluisio et al.

(10) Patent No.: US 9,701,293 B2
(45) Date of Patent: *Jul. 11, 2017

(54) BICYCLE CABLE ROUTING SYSTEM

(71) Applicant: Specialized Bicycle Components, Inc., Morgan Hill, CA (US)

(72) Inventors: Christopher P. D'Aluisio, Corralitos, CA (US); Jeffrey K. Bowers, San Jose, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 14/741,250

(22) Filed: Jun. 16, 2015

(65) Prior Publication Data

US 2015/0367825 A1     Dec. 24, 2015

Related U.S. Application Data

(63) Continuation-in-part of application No. 14/309,234, filed on Jun. 19, 2014, now Pat. No. 9,056,646.

(51) Int. Cl.
*B62K 3/02* (2006.01)
*B62K 19/30* (2006.01)
(Continued)

(52) U.S. Cl.
CPC ............ *B60T 11/046* (2013.01); *B62K 19/06* (2013.01); *B62K 19/30* (2013.01); *B62K 19/32* (2013.01);
(Continued)

(58) Field of Classification Search
None
See application file for complete search history.

(56) References Cited

U.S. PATENT DOCUMENTS 4,102,219 A  *  7/1978  Plamper ................. B62K 19/30
                                                                254/389
5,791,671 A       8/1998  Tang et al.
(Continued)

FOREIGN PATENT DOCUMENTS

CN        201195583        2/2009
EP          1598263       11/2005
(Continued)

OTHER PUBLICATIONS

EP15172953.0 Extended European Search Report dated Oct. 14, 2015 (11 pages).

*Primary Examiner* — Tony Winner
(74) *Attorney, Agent, or Firm* — Michael Best & Friedrich LLP

(57) ABSTRACT

A bicycle including a frame, a fork rotationally coupled to the frame within a head tube of the frame, and a wheel rotationally coupled to the fork. The fork has a steerer tube, and the bicycle further includes a stem that is coupled to the steerer tube, and a handlebar coupled to the stem for steering the wheel. The handlebar supports an actuator adapted to control a bicycle component. The bicycle also includes a cable housing that is disposed in the handlebar, and a cable that is coupled to the actuator and routed internally within the handlebar and the stem toward the head tube. The portion of the cable within the handlebar is routed through the cable housing, and the portion of the cable within the stem is exposed.

20 Claims, 21 Drawing Sheets

(51) Int. Cl.
  *B62K 19/06*  (2006.01)
  *B62K 21/22*  (2006.01)
  *B62K 19/32*  (2006.01)
  *B62M 25/02*  (2006.01)
  *B62L 3/00*  (2006.01)
  *B60T 11/04*  (2006.01)
  *B62J 99/00*  (2009.01)

(52) U.S. Cl.
  CPC ............... *B62K 21/22* (2013.01); *B62L 3/00* (2013.01); *B62M 25/02* (2013.01); *B62J 2099/0046* (2013.01); *Y10T 29/49828* (2015.01)

(56) References Cited

U.S. PATENT DOCUMENTS

| | | |
|---|---|---|
| 6,220,398 B1 | 4/2001 | Wu |
| 6,308,806 B1 | 10/2001 | Nielsen |
| 7,000,936 B2 | 2/2006 | Schmider |
| 7,147,238 B2 | 12/2006 | Oi |
| 7,396,032 B2 | 7/2008 | Horiuchi |
| 7,891,687 B2 | 2/2011 | Schmider |
| 2005/0057017 A1* | 3/2005 | Hara ............... B62K 21/12 280/279 |
| 2006/0145446 A1 | 7/2006 | Schmider |
| 2010/0213684 A1 | 8/2010 | D'Aluisio |
| 2011/0120256 A1 | 5/2011 | Giroux |
| 2013/0026732 A1 | 1/2013 | Kohl et al. |
| 2013/0154234 A1 | 6/2013 | Shadwell |

FOREIGN PATENT DOCUMENTS

| | | |
|---|---|---|
| EP | 1504987 | 1/2006 |
| EP | 2551178 | 1/2013 |
| TW | 200909289 | 3/2009 |
| TW | 200916364 | 4/2009 |
| WO | 2008150159 | 12/2008 |
| WO | 2012168781 | 12/2012 |
| WO | 2013041824 | 3/2013 |

* cited by examiner

BICYCLE CABLE ROUTING SYSTEM

BACKGROUND

The present invention relates generally to bicycles, and particularly to a system for routing cables through a handlebar and stem of the bicycle.

Bicycles commonly have flexible cables that are used to remotely actuate various bicycle components. For example, cables can be used to link brake levers on the handlebars to brake calipers at remote locations in order to facilitate actuation of the brakes by squeezing the brake levers on the handlebars. Cables can also be used for remote actuation of other components, such as shifters.

Frequently, cables are routed through cable housings that facilitate the routing of cables along curved paths. The cables and housings are commonly routed along the exterior of bicycle frame and components, and thus are visible and can reduce the aerodynamic efficiency of the bicycle.

To alleviate this concern, it is known to route cables and their housings inside the bicycle frame. For example, it is known from U.S. Pat. No. 7,000,936 to route a cable and housing through a handlebar stem, and it is known from PCT Application No. WO2012/168781 to route a cable and housing through a head tube, between a fork steerer tube and an upper headset bearing.

SUMMARY

One problem with some of the prior art internal cable routing is that it makes it difficult to change the length or height of the handlebar stem. Specifically, such a change in the size of the stem typically requires that the length of the cable and housing be adjusted. In addition, for those prior art systems that route the cable and housing between the steerer tube and upper headset bearing, the diameter of the upper end of the head tube and corresponding bearing need to be quite large, thereby increasing the cost and reducing the aerodynamic efficiency of the bicycle.

The present invention provides a bicycle including a frame, a fork rotationally coupled to the frame within a head tube of the frame, and a wheel rotationally coupled to the fork. The fork has a steerer tube, and the bicycle further includes a stem that is coupled to the steerer tube, and a handlebar coupled to the stem for steering the wheel. The handlebar supports an actuator adapted to control a bicycle component. The bicycle also includes a cable housing that is disposed in the handlebar, and a cable that is coupled to the actuator and routed internally within the handlebar and the stem toward the head tube. The portion of the cable within the handlebar is routed through the cable housing, and the portion of the cable within the stem is exposed.

The present invention also provides a steering assembly for a bicycle that has a frame with a head tube. The steering assembly includes a fork that has a steerer tube, a stem that is coupled to the steerer tube, and a handlebar that is coupled to the stem and that is configured to support an actuator. The steering assembly also includes a housing stop disposed at the interface between the handlebar and the stem, and a cable housing positioned within the handlebar and terminating at the housing stop. A cable is adapted to be coupled to the actuator to control a bicycle component, and the cable is routed within the handlebar through the cable housing. The cable also is routed through the housing stop and within the stem toward the head tube, and the portion of the cable extending from the housing stop within the stem is exposed.

The present invention also provides a method of routing a cable along a bicycle between a handlebar-mounted actuator and a bicycle component coupled to the frame. The method includes routing a cable internally through a handlebar of the bicycle within a first cable housing, routing the cable through a stem of the bicycle without a cable housing, and routing the cable through a head tube of the bicycle within a second cable housing.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
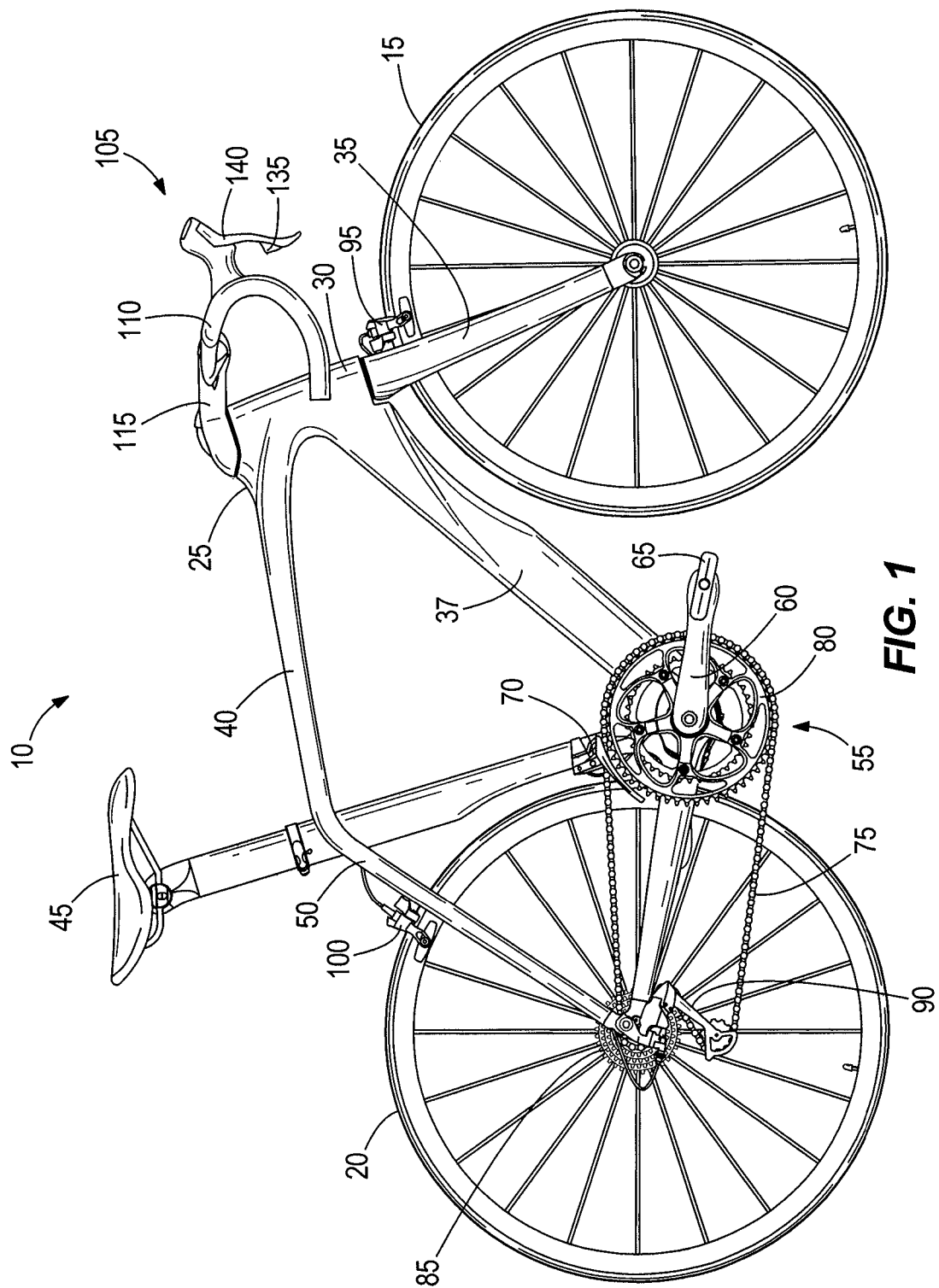
FIG. 1 is a side view of a bicycle embodying the present invention.
Figure 2:
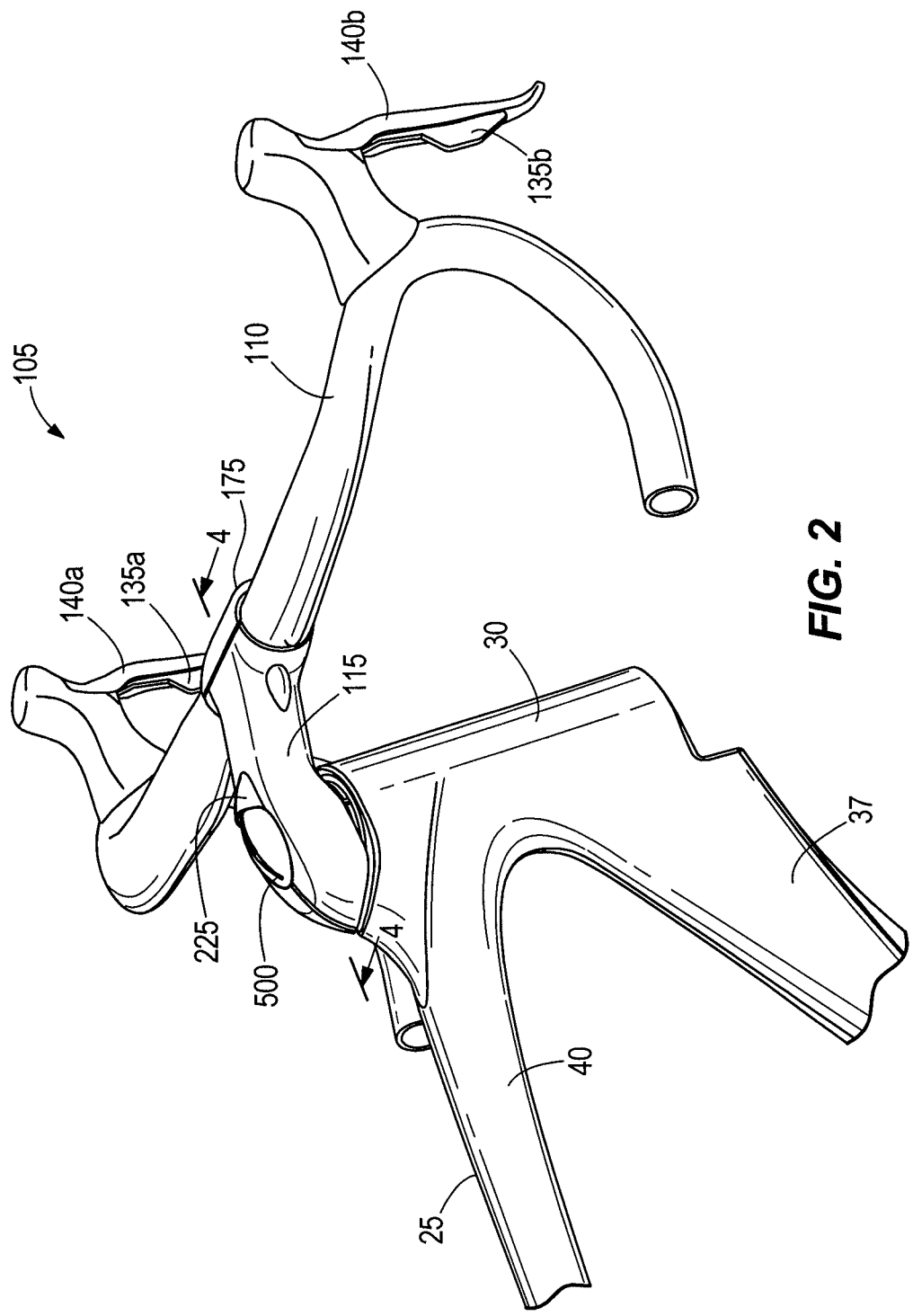
FIG. 2 is an enlarged perspective view of a steering assembly and a portion of a frame of the bicycle of FIG. 1.

FIG. 1 illustrates a bicycle 10 that includes a front wheel 15, a rear wheel 20, and a frame 25. The frame 25 has a head tube 30, a front fork 35 that is rotationally supported by the head tube 30 and that secures the front wheel 15 to the frame 25. The frame 25 also has a down tube 37, a top tube 40, a seat 45 supported by the frame 25, and a rear frame triangle 50 supporting the rear wheel 20. The frame 25 supports a drive train 55 that has a crankset 60 rotatably mounted to the frame 25 (within a bottom bracket, not shown). As shown in FIG. 1, the crankset 60 supports pedals 65 that are engageable by a rider to provide motive force for the bicycle 10. The drive train 55 also includes a front derailleur 70 that shifts a chain 75 between different chain rings 80 (one shown). A plurality of rear cogs 85 are mounted to the rear wheel 20 and are connected to the crankset 60 by the chain 75. A rear derailleur 90 shifts the chain between different rear cogs 85. The bicycle 10 also includes a front brake 95 mounted on the front wheel 15, and a rear brake 95 mounted on the rear wheel 20.

With reference to FIGS. 1-4, the bicycle 10 also includes a steering assembly 105 that has a handlebar 110 and a stem 115 that secures the handlebar 110 to a steerer tube 120 of the front fork 35 via a headset 125 such that movement of the handlebar 110 results in movement of the stem 115 and the fork 35. The handlebar 110 has slots 130 that are aligned with each other adjacent the middle portion of the handlebar 110. The slots 130 provide access to the hollow interior of the handlebar 110. The front and rear derailleurs 70, 90 are actuated by respective shift controllers or actuators 135a, 135b attached to the handlebar 110. The front and rear brakes 95, 100 are actuated and controlled by respective front and rear brake controllers or actuators 140a, 140b that are attached to the handlebar 110.

As illustrated in FIGS. 3 and 7-10, the stem 115 is defined by an elongated body that has a first end 145, a second end 150 opposite the first end 145, and a hollow neck portion 155 disposed between the first end 145 and the second end 150. As illustrated, the first end 145 of the stem 115 is concave and conforms to the curvature or shape of the handlebar 110. The first end 145 also has an opening 160 that aligns with the rearward-facing slot 130 in the handlebar 110. As illustrated, fastener posts 165 with threaded holes 170 are disposed on lateral extents of the opening 160. The handlebar 110 is secured to the stem 115 by a clamp or faceplate 175 that attaches to the stem 115 via fasteners 180 extending through holes in the clamp 175 and into the fastener posts 165. The stem 115 and the faceplate 175 sandwich the handlebar 110 to secure the handlebar 110 to the stem 115.

Figure 3:
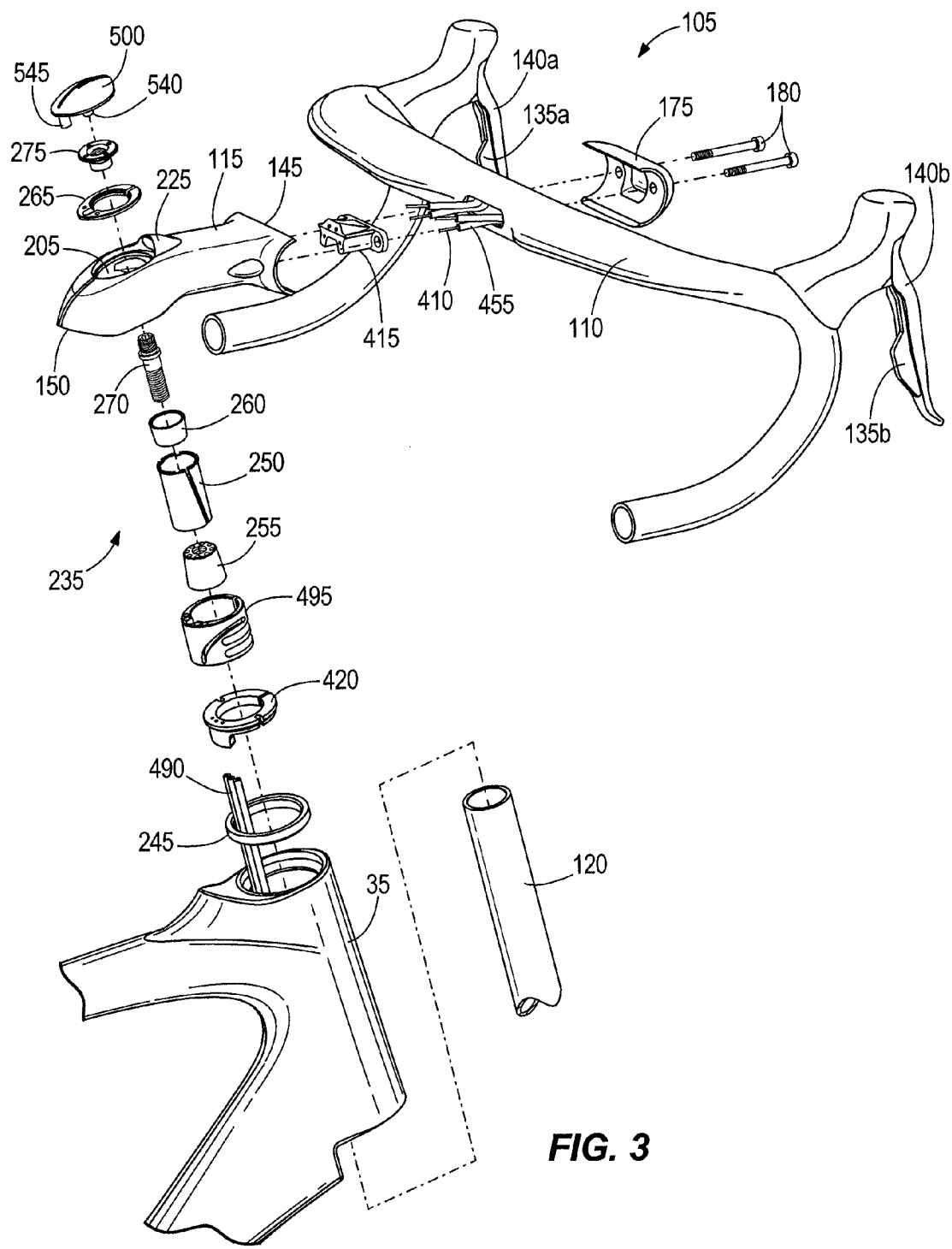
FIG. 3 is an exploded perspective view of a portion of the frame and the steering assembly of FIG. 1.
Figure 8:
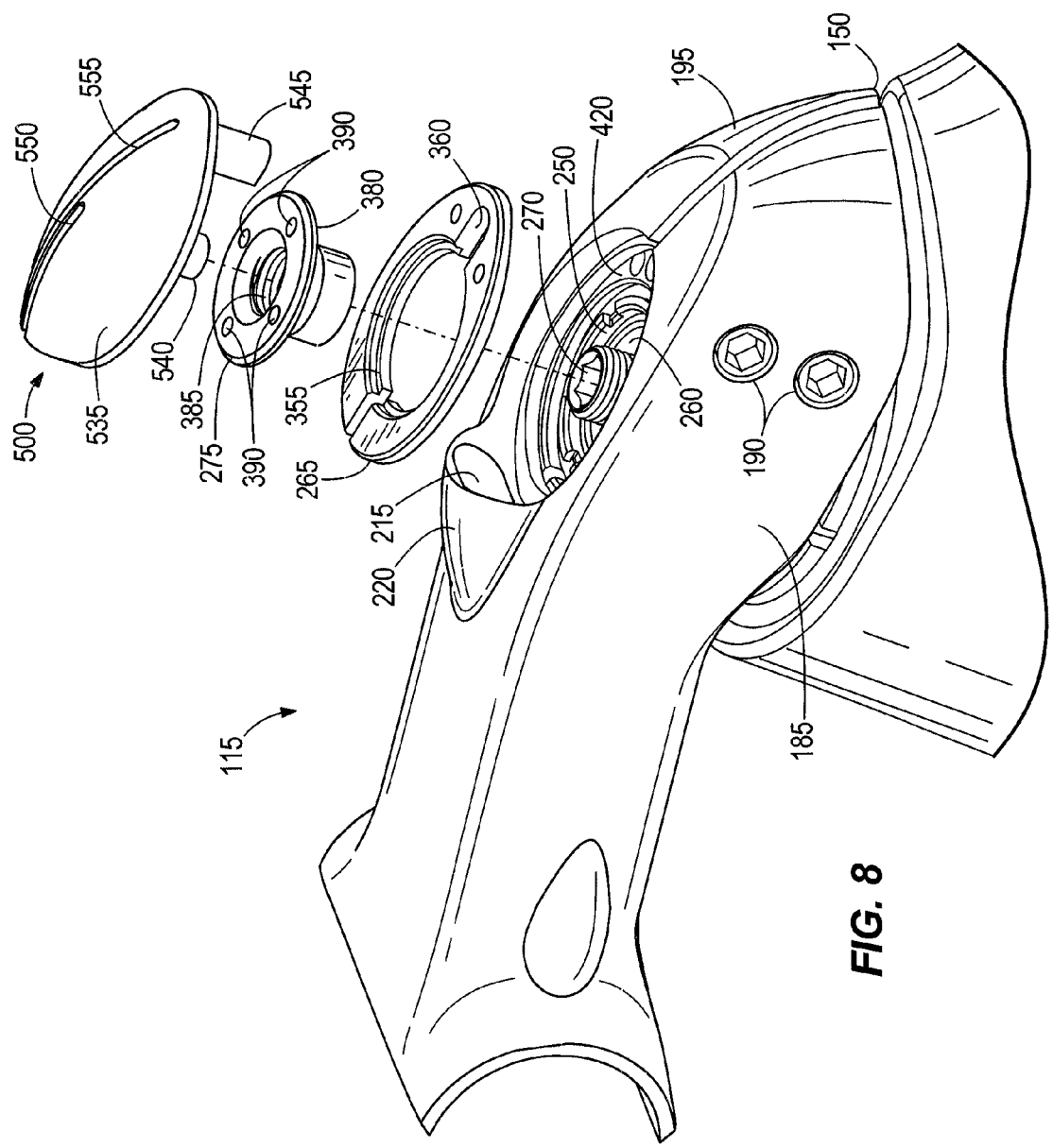
FIG. 8 is an exploded perspective view of a portion of the steering assembly illustrating components of a headset for the steering assembly.
Figure 9:
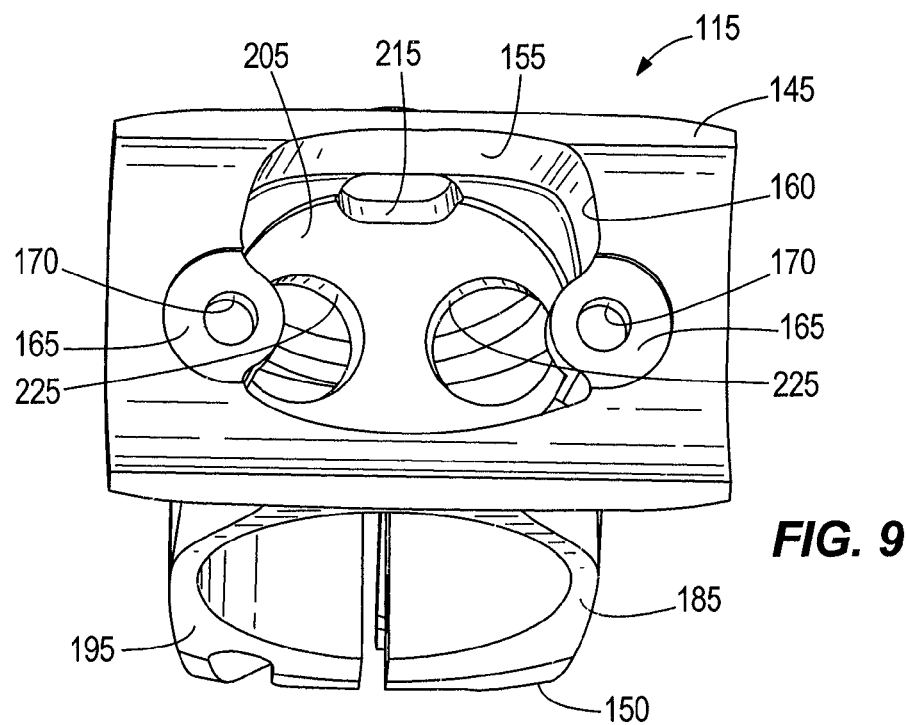
FIG. 9 is a front perspective view of a stem of the steering assembly.
Figure 10:
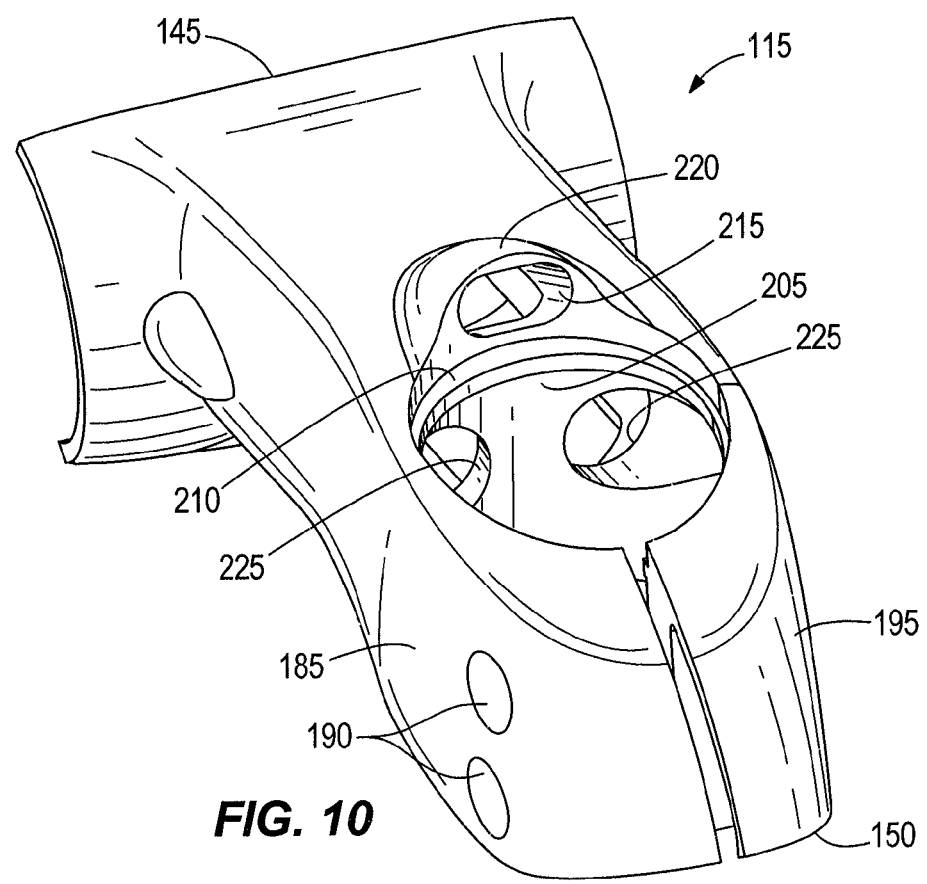
FIG. 10 is a rear perspective view of the stem of FIG. 9.
Figure 11:
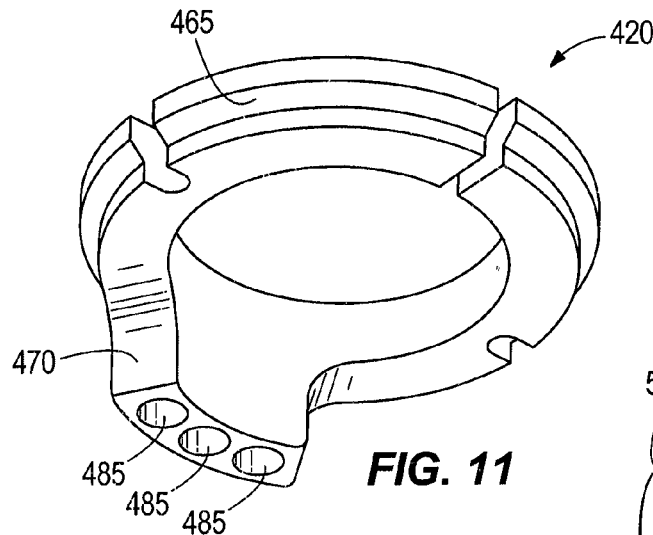
FIG. 11 is a perspective view of a rear housing stop of the cable routing system.

The second end 150 is split into a first portion 185 that has through holes 190 (see FIGS. 4 and 5), and a second portion 195 that has threaded blind holes 200. Fasteners (not shown) secure or clamp the stem 115 relative to the steerer tube 120. Referring to FIGS. 3, 8, and 10, the second end 150 also has an internal wall 205 that defines a hollow, oblong-shaped (e.g., egg-shaped) column through which the steerer tube 120 extends when the steering assembly 105 is assembled onto the frame 25. The upper end of the column is recessed from an upper surface of the stem 115 such that the stem 115 has a recessed platform 210 situated around the upper end of the column. The stem 115 also has a first passage 215 (FIG. 4) extending from the hollow interior of the stem 115 through a domed element 220 of the stem 115 body, and second passages 225 (FIGS. 7, 9, and 10) that extend through the internal wall 205. The first passage 215 has an opening that is disposed above the platform 210, and the second passages 225 have openings that communicate through the wall 205.

Figure 4:
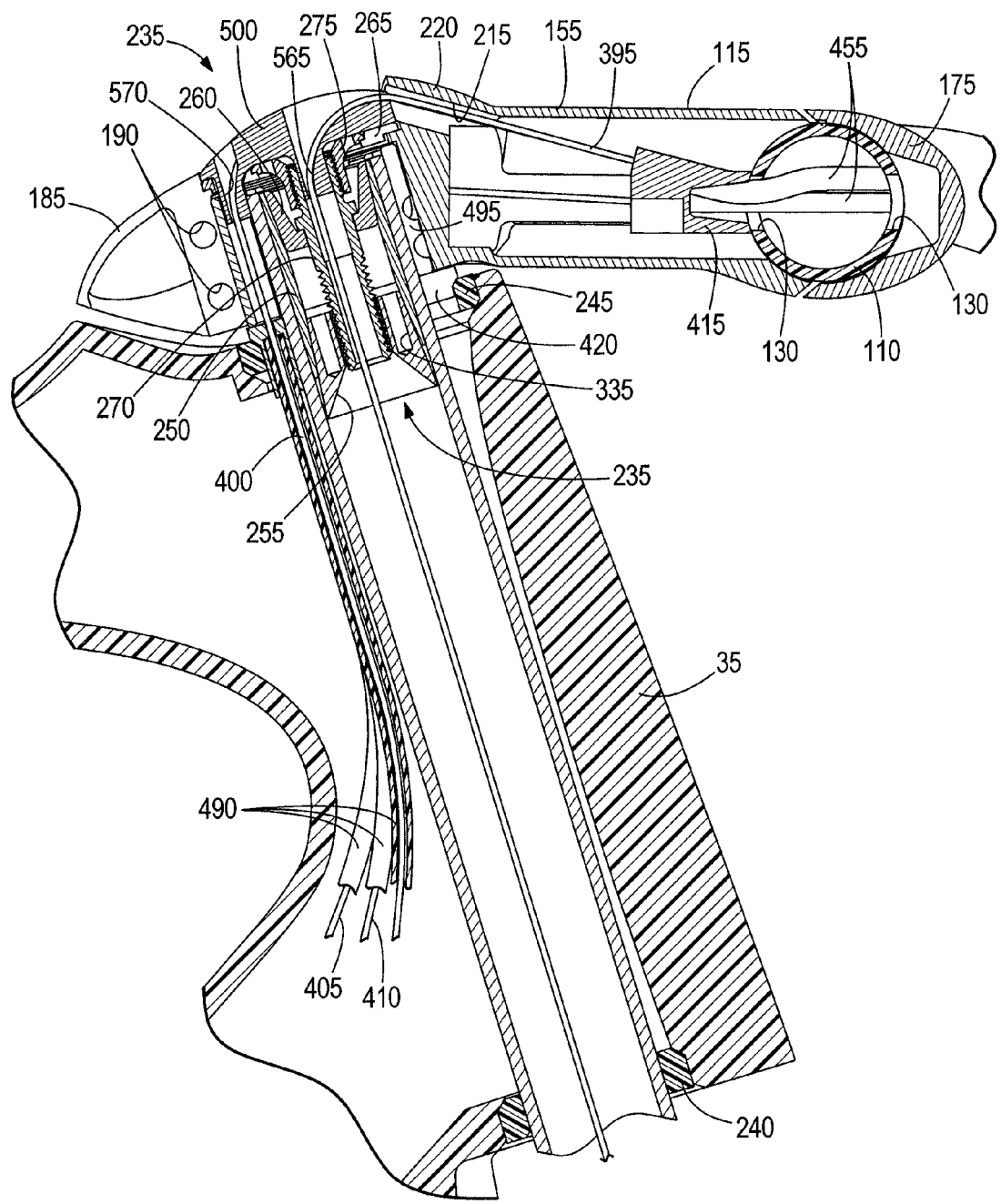
FIG. 4 is a section view of the steering assembly and the frame of FIG. 2 taken along line 4-4.

Referring to FIG. 4, the headset 125 includes a bearing assembly and a preload mechanism 235 that preloads the bearing assembly 230. More specifically, the bearing assembly includes a lower bearing 240 that is positioned adjacent a lower end of the head tube 30, and an upper bearing 245 that is positioned adjacent an upper end of the head tube 30. As appreciated by one of ordinary skill in the bicycle arts, the bearing assembly also includes suitable bearing races and other components (e.g., compression rings) to support the bearings in the head tube and around the steerer tube.

Figure 15:
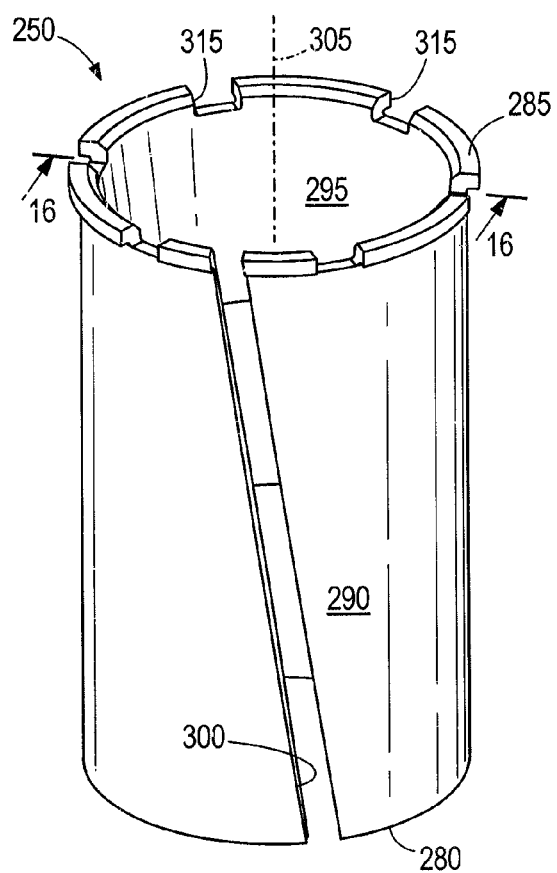
FIG. 15 is a front perspective view of a sleeve of the headset.
Figure 16:
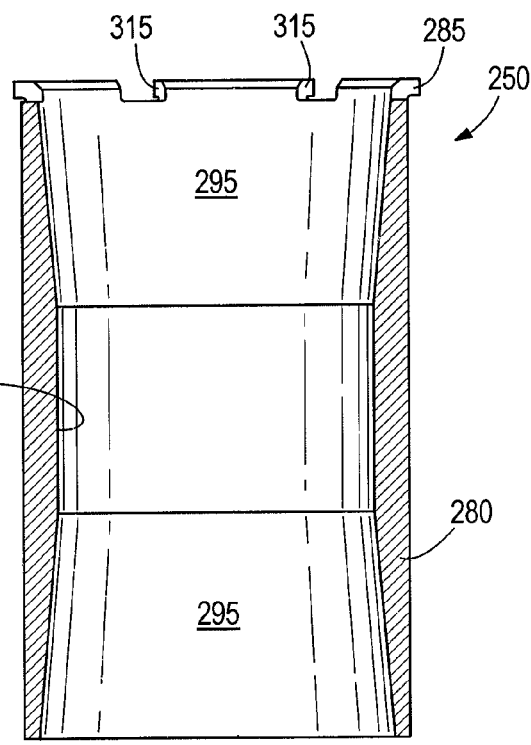
FIG. 16 is a section view of the sleeve of FIG. 15 taken along line 16-16.

With reference to FIGS. 4, 8, and 15-19, the preload mechanism 235 includes a sleeve 250, a lower or first cone 255, an upper or second cone 260, a cap washer 265, a preload bolt 270, and a preload nut 275. Referring to FIGS. 15 and 16, the sleeve 250 has a wall 280 and a lip 285 at an upper end of the wall 280. The wall 280 is split and has a cylindrical outer surface 290 and an inner surface 295 that is engageable by the first and second cones 255, 260. The split is defined by a slit 300 that extends from the upper end to an opposite lower end. The slit 300 is skewed relative to a longitudinal axis 305 defined by the sleeve 250. Referring to FIG. 16, the inner surface 295 is tapered inward from the first end toward a central section 310 of the sleeve 250, and the inner surface 295 is tapered inward from the second end toward the central section 310. FIGS. 15 and 16 show that the lip 285 is segmented to form gaps 315 around the periphery of the sleeve 250.

Figure 17:
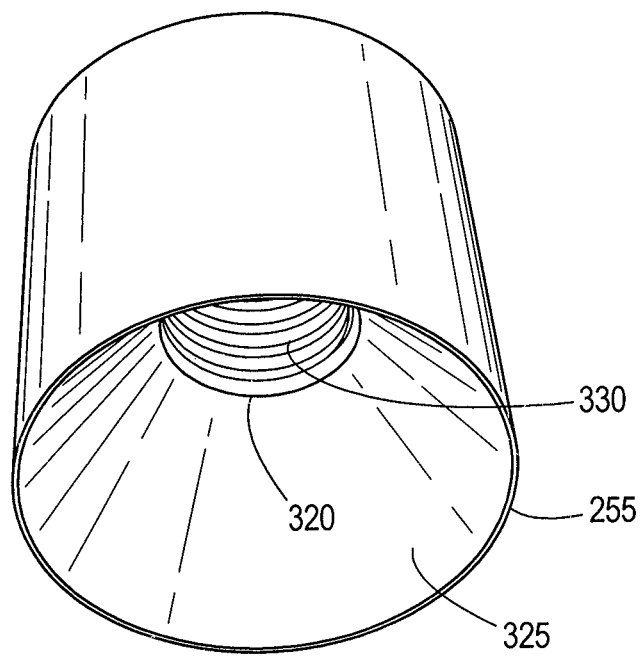
FIG. 17 is a perspective view of a first cone of the headset.

FIGS. 3, 4, and 17 illustrate that the first cone 255 has a tapered or frusto-conical body and a threaded hole 320 that extends axially through the body from a first end (the upper end as illustrated in FIG. 4). The first cone 255 also has a first cavity 325 that extends into the body from a second end axially opposite the first end (the lower end as illustrated in FIG. 4). As illustrated, the first cavity 325 tapers radially inward from the second end such that the inner end of the first cavity 325 defines an aperture 330 that aligns with the inner end of the threaded hole 320. In addition, optional blind holes 335 extend into the body from the first end (e.g., to reduce weight).

Figure 18:
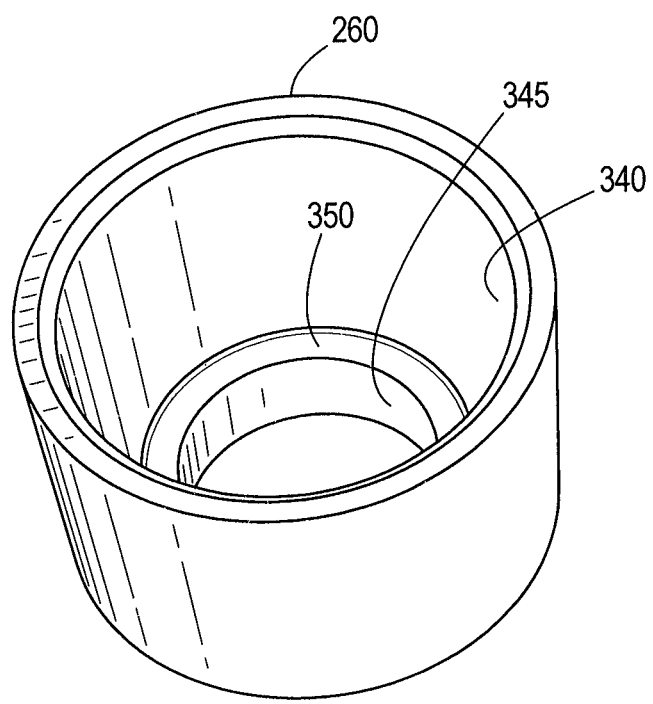
FIG. 18 is a perspective view of a second cone of the headset.

FIGS. 3, 4, and 18 show that the second cone 260 has a tapered or frusto-conical body, and a second cavity 340 that extends into the body from a first end (the upper end as illustrated in FIG. 4), and a hole 345 that extends into the body from a second end (the lower end as illustrated in FIG. 4) of the body axially opposite the first end. As illustrated, the second cavity 340 tapers radially inward from the first end toward the second end. The cavity 340 and the hole 345 cooperate to define a ledge 350 on the interior of the second cone 260.

Referring to FIGS. 3, 4, and 8, the cap washer 265 is engaged with the platform 210 on the stem 115 and is positioned over the column. FIG. 8 illustrates that the washer 265 is defined by a split ring body and has a countersunk rim 355 disposed around the inner edge of the body. The rim 355 is interrupted by a pocket 360 that is disposed opposite the split in the washer 265. The pocket 360 extends from the inner edge radially outward toward the outer edge of the washer 265.

Figures 19, 20:
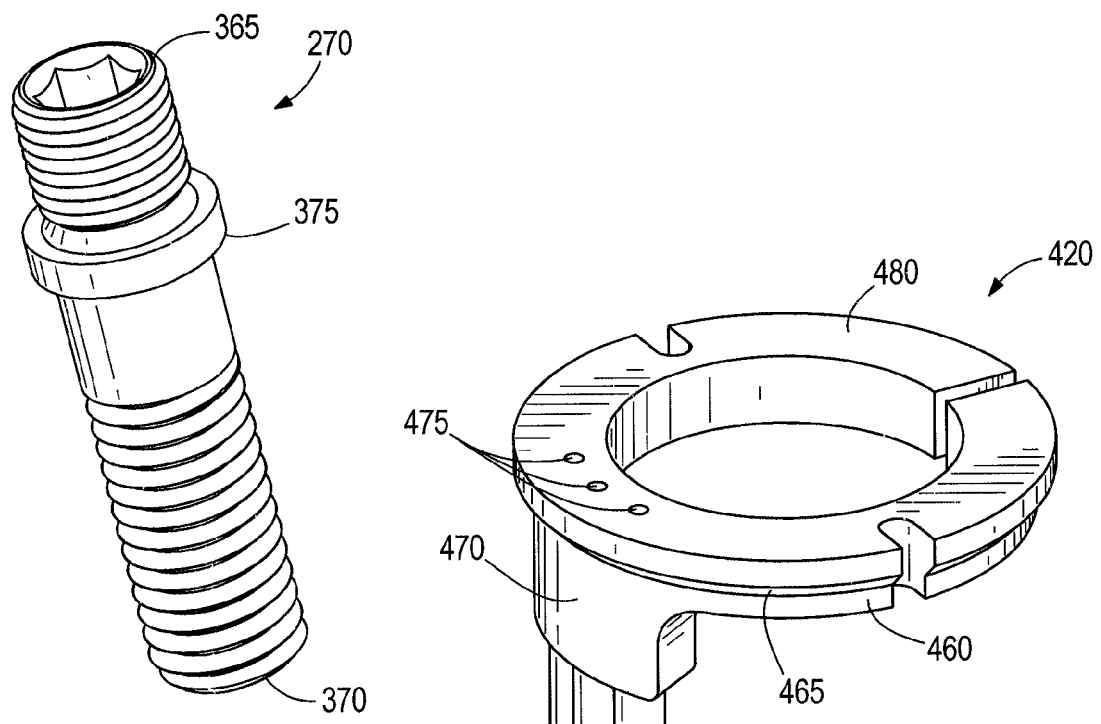
FIG. 19 is a perspective view of a preload bolt of the headset.
FIG. 20 is a perspective view of the rear housing stop and cable housings attached to the rear housing stop.

Referring to FIGS. 3 and 4 and 19, the preload bolt 270 has a threaded first end 365, a threaded second end 370, and a shoulder 375 located between the threaded ends 365, 370. The first threaded end 365 extends through the hole 345 in the second cone 260 and threads into the hole 335 in the first cone 255, and the shoulder 375 is engaged with the ledge 350. As illustrated, the preload bolt 270 is hollow and the interior of the upper end of the bolt is shaped to be engageable by a tool (e.g., by a hex key).

FIG. 8 shows that the preload nut 275 is defined by a cylindrical body that has a circumferential flange 380 at one end and a threaded passageway 385 extending through the axial center of the preload nut 275. The preload nut 275 is nested in the cap washer 265 and rests on the rim 355. The first end 365 of the preload bolt 270 is threaded into the passageway and is accessible from above the preload nut 275 by the tool. Holes 390 are spaced apart from each other around the flange 380 so that the support nut 275 can be rotated or held in place by a spanner (e.g., while turning or holding the preload bolt 270 in place).

Figure 5:
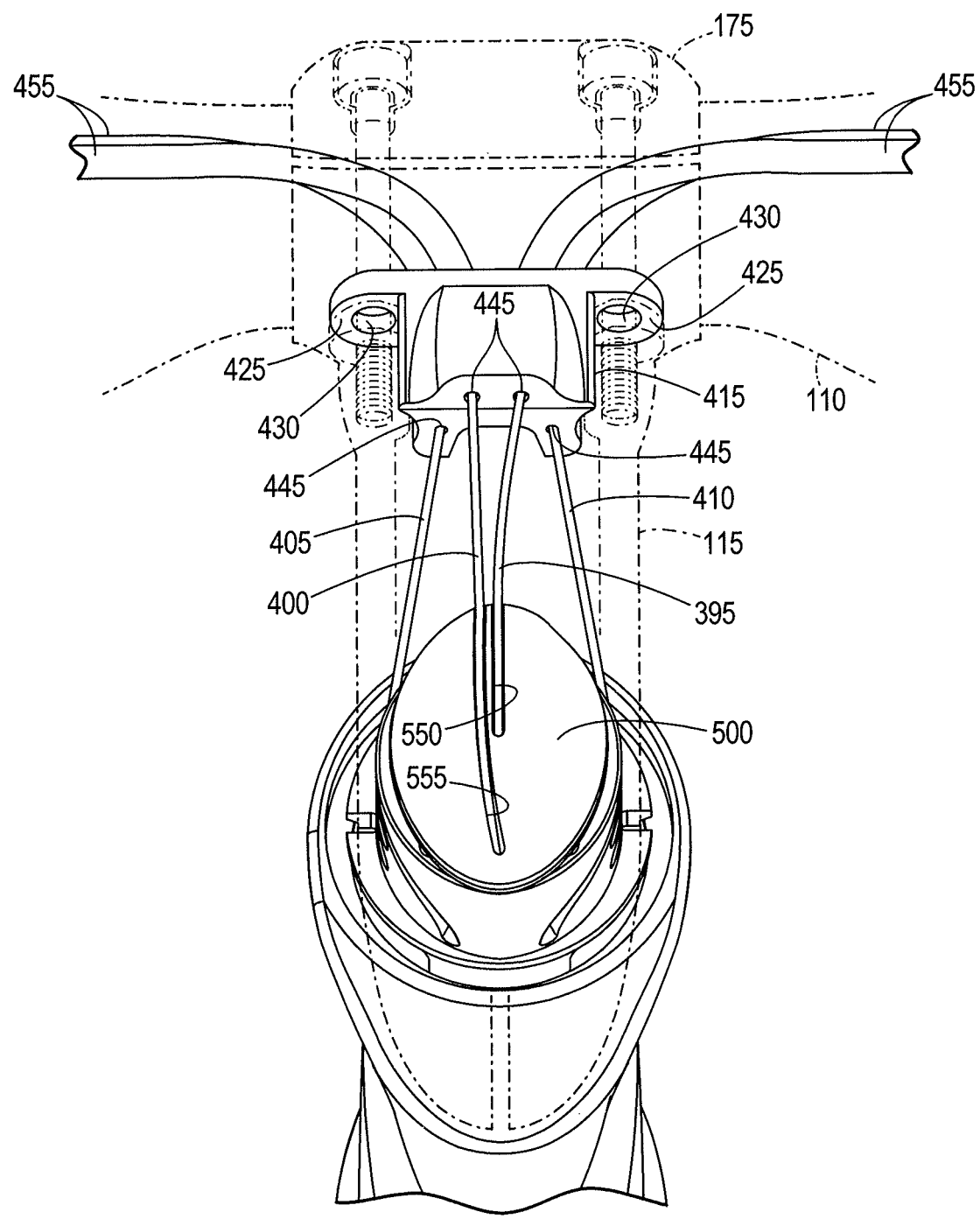
FIG. 5 is an upper perspective view of a portion of the steering assembly illustrating a cable routing system from the handlebar through the head tube.
Figure 6:
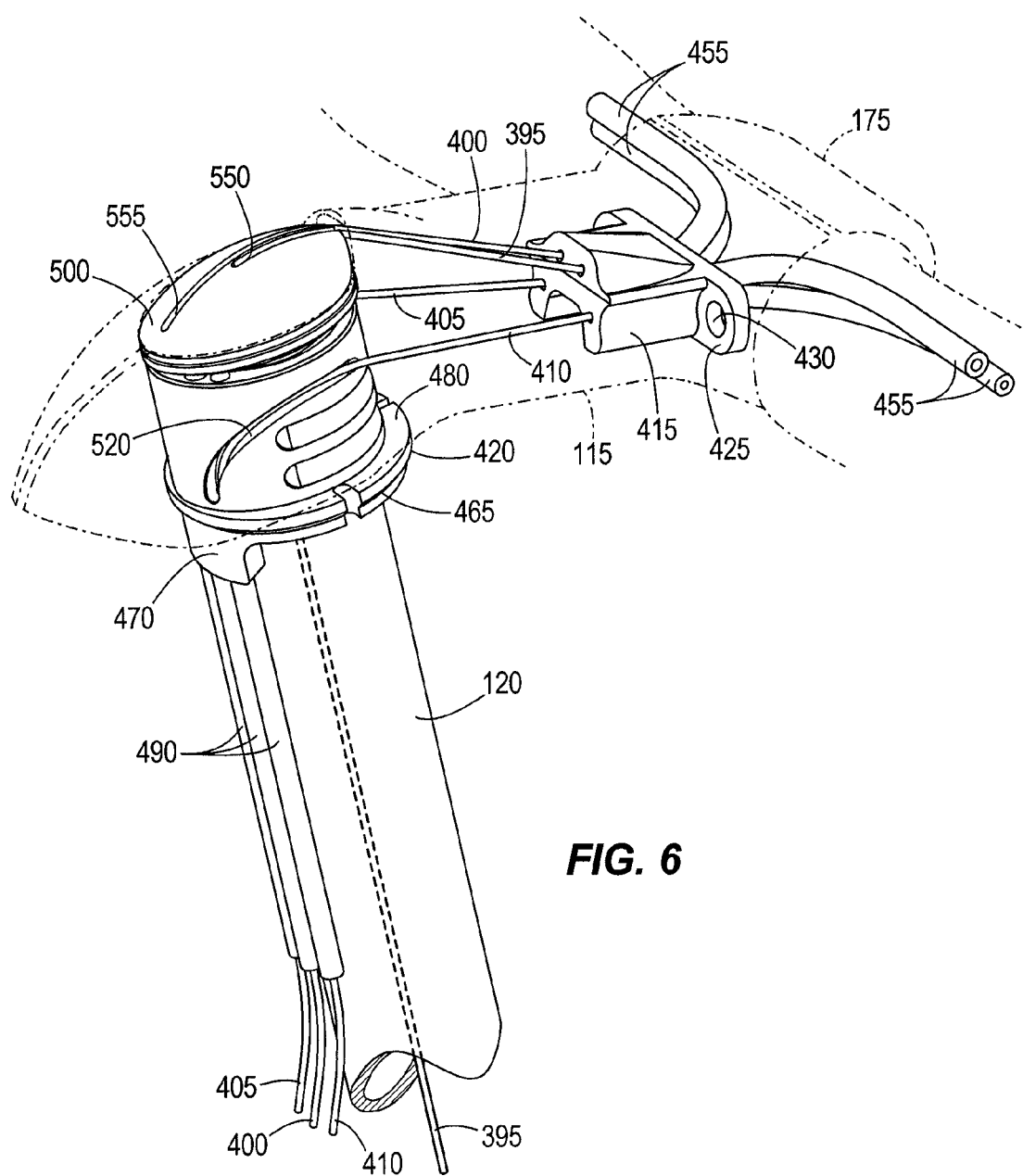
FIG. 6 is another perspective view of a portion of the steering assembly illustrating the cable routing system of FIG. 5.
Figure 7:
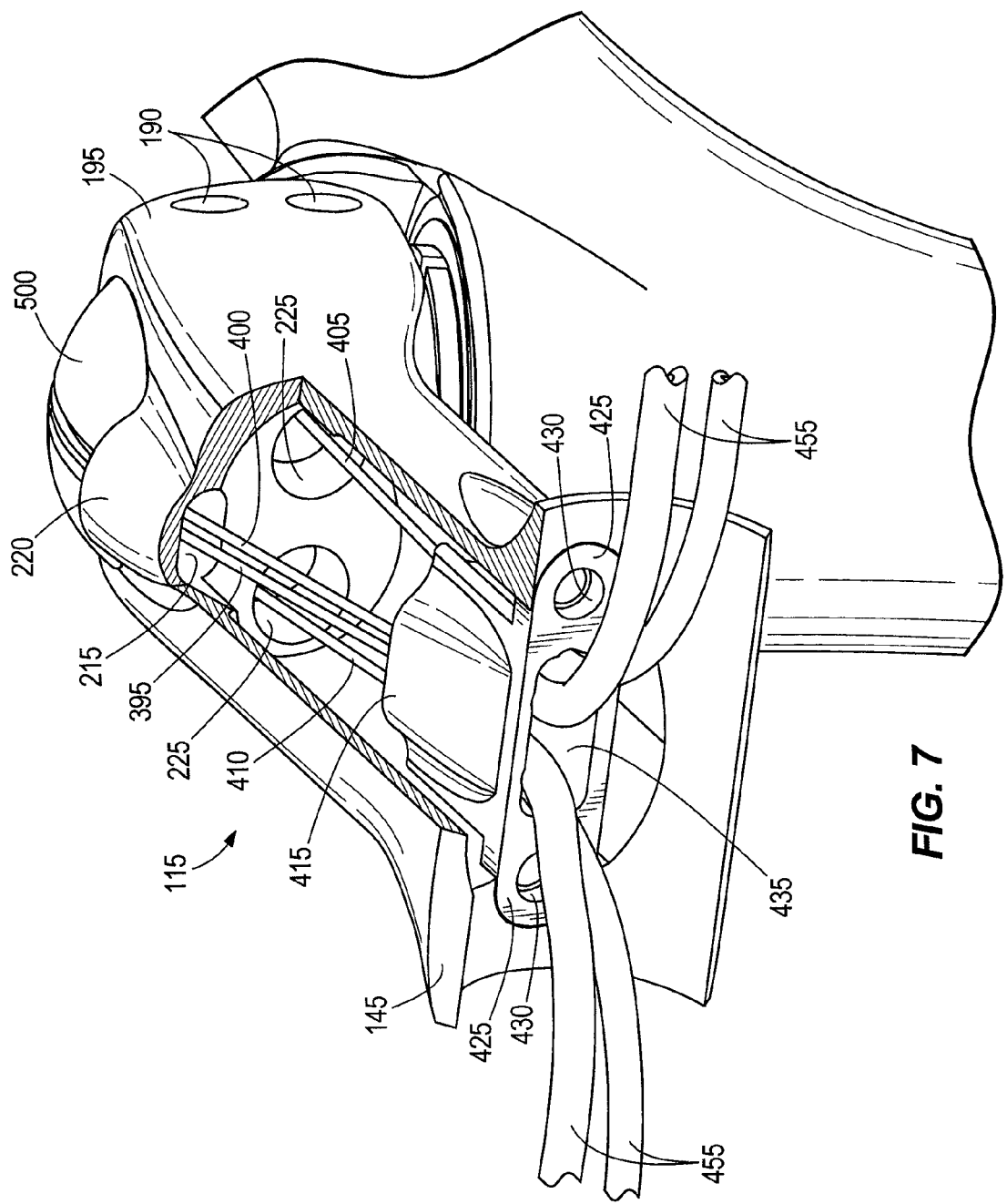
FIG. 7 is another perspective view of a portion of the steering assembly illustrating the cable routing system of FIG. 5.

With reference to FIGS. 5 and 6, the front brake actuator 140 is connected to the front brake 95 by a front brake cable 395, and the rear brake actuator 140 is connected to the rear brake by a rear brake cable 400. Also, the front shift actuator 135 is connected (e.g., electrically or mechanically) to the front derailleur 70 by a first shift cable 405, and the rear shift actuator 135 is connected (e.g., electrically or mechanically) to the rear derailleur 90 by a second shift cable 410. Although the front and rear brake cables 395, 400 are illustrated as a mechanical (e.g., wire) control cables, the cables can be a hydraulic cable. While the bicycle 10 is described in detail with regard to the front and rear brake cables 395, 400 and the first and second shift cables 405, 410, the bicycle 10 can include additional cables.

Referring to FIGS. 3-6, the bicycle 10 also includes a cable routing system that forms part of the steering assembly 105 and that routes the cables from their respective actuators 135, 140 through the steering assembly 105 to their respective termination points. More specifically, the cable routing system includes a first housing stop 415 that is disposed at the interface between the handlebar 110 and the stem 115, and a second housing stop 420 that is coupled to the steerer tube 120.

Figure 14:
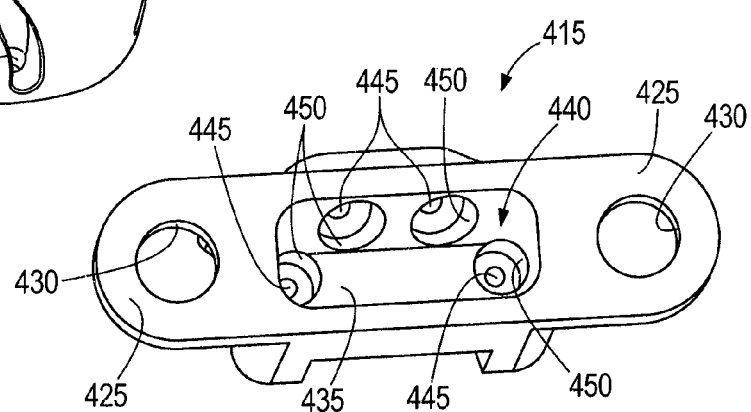
FIG. 14 is a perspective view of a front housing stop of the cable routing system.

FIGS. 3-6 and 14 illustrate that the first housing stop 415 is defined by a body that has lateral extensions 425 and that is nested in the first end 145 of the stem 115 so that holes 430 in the extensions 425 align with the threaded holes 170 in the fastener posts 165. The body also has a recessed wall 435 that defines a cavity 440 disposed between the extensions 425. Cable passageways 445 (e.g., four passageways 445 are illustrated) extend from the recessed wall 435 through the body. As illustrated in FIG. 14, each cable passageway 445 has a first countersink 450 that is concentric with the opening to the cable passageway 445. In some constructions, the body can have a hole (not shown) extending from the recessed wall through the body adjacent one or more cable passageways (e.g., to accommodate hydraulic cables). Referring back to FIGS. 3-6, first cable housings 455 are engaged with the first housing stop 415 within the first countersinks 450 and are routed within the handlebar 110 between the respective actuators 135, 140 and the first housing stop 415. Stated another way, the first cable housings 455 extend within the interior of the handlebar 110 and terminate at the first housing stop 415 within the countersinks 450.

With reference to FIGS. 3, 6, 11, and 20, the second housing stop 420 is defined by a compression ring (i.e. the second housing stop 420 has a split in the circumferential body of the ring) that surrounds the steerer tube 120. The second housing stop 420 includes a lower portion 460 that has a chamfer 465 and that defines a bearing race for the upper bearing 245. The second housing stop 420 also has an arc-shaped wall 470 that extends outward (downward as illustrated in FIGS. 3 and 4) from the lower portion 460 at a location that is radially inward relative to the chamfer 465. As best seen with reference to FIGS. 11 and 20, second cable passageways 475 (three passageways are illustrated) extend through the second housing stop 420 from an upper surface 480 through the arc-shaped wall 470, and each cable passageway 475 has a second countersink 485 that extends into the arc-shaped wall 470 a short distance from a distal end of the wall 470. As shown in FIGS. 3, 4, 6, and 20, second cable housings 490 are engaged with the second housing stop 420 within the second countersinks 485. The second cable housings 490 are routed from the lower end of the second housing stop 420 within the head tube 30 and, for example, into the down tube 37 and/or the top tube 40. That is, the second cable housings 490 have forward ends that terminate at the second housing stop 420.

Figure 13:
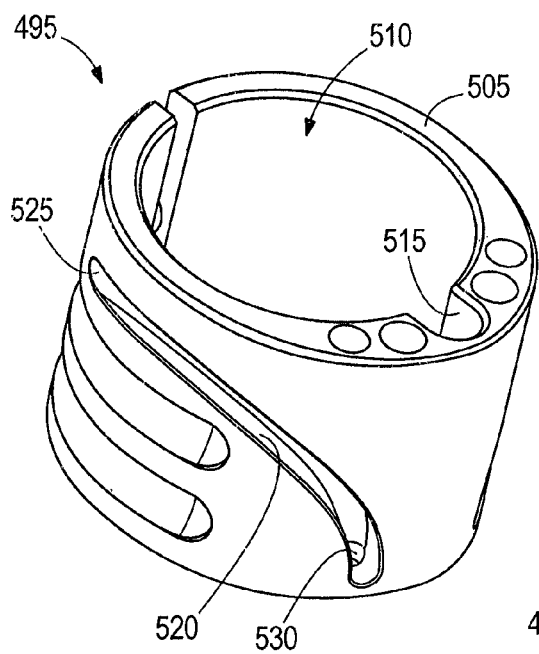
FIG. 13 is a perspective view of a spool of the cable routing system.

FIGS. 3-6 and 13 show that the cable routing system also includes a spool 495 that is coupled to the upper surface 480 of the second housing stop 420 and to the steerer tube 120, and a stem cap 500 that is coupled to the cap washer 265. The spool 495 is defined by a split annular wall 505 sandwiched between the stem 115 (e.g., the lower end of the platform as illustrated in FIG. 4) and the second housing stop 420 when the steering assembly is assembled. As shown in FIGS. 3, 6, and 13, the split annular wall 505 that has a central axial opening 510 and a first channel 515 that extends axially through the spool 495. The first channel 515 is disposed radially outward from the axial opening 510 opposite the split. When the spool 495 is attached to the steerer tube 120, the first channel 515 is aligned with the pocket 360 in the cap washer 265.

The spool 495 also has arcuate channels 520 that extend through the annular wall 505. More specifically, each channel 520 has an entry point 525 located adjacent an upper end of the annular wall 505, and an exit hole 530 located adjacent a lower end of the annular wall 505. As illustrated, the channels 520 extend generally downward and partially around the circumference of the spool 495 such that the distance between the entry points 525 is larger than the distance between the exit holes 530. Although the illustrated spool 495 also includes weight reduction features (in the form of blind holes and annular channels), the spool 495 can be provided without these features.

Figure 12:
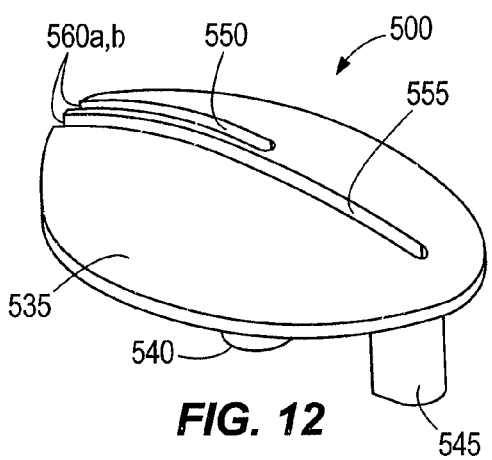
FIG. 12 is a perspective view of a stem cap of the cable routing system.

Referring to FIGS. 3-6, and 12, the stem cap 500 is positioned over the column and the cap washer 265 to enclose the top of the steerer tube 120. As illustrated, the stem cap 500 has a dome-shaped upper portion 535 that provides an aerodynamic profile and that aligns with the domed element of the stem 115. As illustrated, the perimeter profile of the upper portion 535 matches the perimeter profile of the cap washer 265 when viewed from above. FIGS. 3, 4, and 12, show that the stem cap 500 has a first cable post 540 extending outward from a lower surface of the upper portion, and a second cable post 545 extending outward from the lower surface adjacent the perimeter or edge of the upper portion in line with the first cable post 540.

The stem cap 500 also has first and second grooves 550, 555 that are defined in the dome-shaped upper portion 535 to accommodate two of the cables (e.g., the front and rear brake cables 395, 400, as further described below) routed through the steering assembly 105, although the stem cap 500 can include fewer or more grooves to accommodate a corresponding quantity of cables. FIGS. 4-6 illustrate that the first and second grooves 550, 555 have entry points 560a, 560b aligned with the first passage extending through the domed element 535. The first groove 550 extends from an edge of the stem cap 500 nearest the domed element 220 toward the middle of the stem cap 500. As shown in FIG. 4, the first groove 550 curves generally downward and extends deeper into the upper portion 535 before transitioning to a first cable port 570 that extends through the first cable post 540. The second groove 555 extends from the blunt edge 565 across the domed upper portion 535 and, as viewed in FIG. 5, curves slightly such that the blind end of the second groove 555 is in line with (i.e. positioned directly behind) the blind end of the first groove 550 when viewing the stem cap 500 from above. As shown in FIG. 4, the second groove 555 curves generally downward and extends deeper into the upper portion before transitioning to a second cable port 575 that extends through the second cable post 545.

The steering assembly 105 is assembled onto the frame 25 by sliding the lower bearing 240 (and related components such as bearing races) onto the steerer tube 120. The steerer tube 120 is then inserted into the head tube 30 so that the upper end of the steerer tube 120 extends above the top of the head tube 30. The upper bearing 245 (and the head tube bearing race) are then positioned around the steerer tube 120 adjacent the upper end of the head tube 30. The second housing stop 420, with the second cable housings 490 attached to the arc-shaped wall 470, is then coupled to the steerer tube 120 and partially nested in the upper bearing 245 to define the inner bearing race. The split ring shape of the second housing stop 420 allows the diameter of the second housing stop 420 to increase or decrease slightly based on the dimensions of the upper bearing 245.

The cables 395, 400, 405, 410 are routed through portions of the steering assembly 105 via the cable routing system as the steering assembly 105 is being assembled. In one example, the front ends (i.e. the ends to be attached to the actuators) of the cables 395, 400, 405, 410 are routed through the respective first and second passages 215, 225 into the stem 115 from the second end 150 to the first end 145. The cables 395, 400, 405, 410 are then routed through the first housing stop 415 into the first cable housings 455. The first cable housings 455 can be attached to the first housing stop 415 before or after the cables are routed through the first housing stop 415. If the first cable housings 455 are installed afterward, the housings 455 are slid along the cables 395, 400, 405, 410 into engagement with the first housing stop 415. The first cable housings 455 terminate at the first housing stop 415 and the cables are further routed through the first housing stop 415 by virtue of the concentric alignment between the cable passageways 445 and the first cable housings 455.

Next, the handlebar 110 is positioned adjacent the stem 115 and the front ends of the cables 395, 400, 405, 410 and the respective first cable housings 455 are routed internally through the handlebar 110 to the access points (not shown) for the actuators 135, 140. From there, the cables 395, 400, 405, 410 can be operably coupled to the respective actuators 135, 140. In general, the cables 395, 400, 405, 410 and the first cable housings 455 can be routed internally through the handlebar 110 before or after the handlebar 110 is attached to the stem 115. In the latter scenario, the cables 395, 400, 405, 410 and the first cable housings 455 are pulled through the slots 130 in the handlebar 110. The handlebar 110 and the first housing stop 415 are then attached to the stem 115 by extending the fasteners 180 through the clamp, the slots 130 in the handlebar 110, and the extensions 425 on the first housing stop 415 before securing the fasteners 180 to the stem 115 within the holes 170 in the fastener posts 165. With the handlebar 110 secured to the stem 115 over the first housing stop 415 the cables 395, 400, 405, 410 and the respective housings can be routed to the actuator access points.

With the cables 395, 400, 405, 410 internally routed through the stem 115 and the handlebar 110, the other ends of the shift cables 405, 410 are routed through the arcuate channels in the spool 495, through the outermost second cable passageways 475 in the second housing stop 420, and into the second cable housings 490. The second cable housings 490 terminate at the second housing stop 420 and direct the shift cables 405, 410 to the front and rear derailleurs 70, 90.

Referring to FIGS. 4-6, the front brake cable 395 is routed from the stem 115 through the first groove 550 and the first cable post 540 in the stem cap 500. The rear brake cable 400 is routed from the stem 115 through the second groove 555 and the second cable post 545 in the stem cap 500, and then through the pocket 360 in the cap washer 265 before being routed along the stem 115 column and through the spool 495 (within the first channel 515). From there, the rear brake cable 400 is inserted into the center second passageway 475 to be guided through the second housing stop 420 and into one of the second cable housings 490 to be directed to the rear brake 100.

At this point, the spool 495 is attached to the steerer tube 120 so that the spool 495 rests on the upper surface 480 of the second housing stop 420. The cables 395, 400 facilitate alignment of the spool 495 relative to the second housing stop 420. With the spool 495 in place, the stem 115 is loosely coupled to the steerer tube 120 around the spool 495. The top of the spool 495 is engaged with the underside of the platform 210 such that the spool 495 is sandwiched between the stem 115 and the second housing stop 420 after the stem 115 is placed around the spool 495.

With reference to FIGS. 3 and 4, the remainder of the headset 125 is preferably attached to the steerer tube 120 after the stem 115 is secured to the steerer tube 120. More specifically, the first cone 255 and second cone 260 are inserted into opposing ends of the sleeve 250, and the preload bolt 270 is inserted through the second cone 260 and into the first cone 255. This sub-assembly is inserted into the upper end of the steerer tube 120 and secured in place by tightening the preload bolt 270. The stem 115 is then positioned over the upper end of the steerer tube 120, and the cap washer 265 is placed into engagement with the internal wall 205 of the stem 115. The preload nut 275 is then threaded over the upper threaded end of the preload bolt 270 and tightened to apply a preload to the headset bearings prior to securing the stem 115 to the steerer tube 120, as is known in the art.

The front brake cable 395 can be routed through the cap washer 265 and inside the preload bolt 270 generally downward to the front brake 95 through the steerer tube 120 before or after the stem 115 is secured to the steerer tube 120. After the stem 115 is properly aligned with the steerer tube 120 and fork, and the appropriate preload on the upper bearing 245 has been attained, the stem 115 is secured or clamped to the spool 495 (and also the steerer tube 120 via the spool 495) by tightening the fasteners 180 in the blind holes 200 of the stem 115. The split design of the spool 495 allows compression of the spool 495 in response to the clamping force so that the spool 495 and the stem 115 securely engage the steerer tube 120 without relative movement. The stem cap 500 can then be attached to the washer 265 (e.g., snap-fit) to cover the opening in the steerer tube 120 and the washer 265.

When the steering assembly 105 is fully assembled, each cable 395, 400, 405, 410 is routed from the corresponding actuator 135, 140 internally through one of the first cable housings 455 within the handlebar 110 to the first housing stop 415. As illustrated, the portion of the front brake cable 395 extending from the first housing stop 415, the stem 115, the stem cap 500, and the preload bolt 270 is exposed. Also, the portions of the remaining cables 400, 405, 410 extending from the first housing stop 415 to the second housing stop 420 bolt are exposed. Stated another way, at least the portion of the front brake cable 395 between the first housing stop 415 and the steerer tube 120, and the portions of the remaining cables 400, 405, 410 between the housing stops 415, 420, are routed through the steering assembly 105 without a cable housing (i.e. not covered by a housing).

In some constructions, the channels 515, 520 in the spool 495 or the grooves 550, 555 in the stem cap 500 may be optional. In these constructions, the cables 395, 400, 405, 410 can be routed either entirely through the spool 495, entirely through the stem cap 500, a combination of the spool 495 and the stem cap 500, or through another structure or combination of structures positioned on or adjacent the steerer tube 120.

Figure 21:
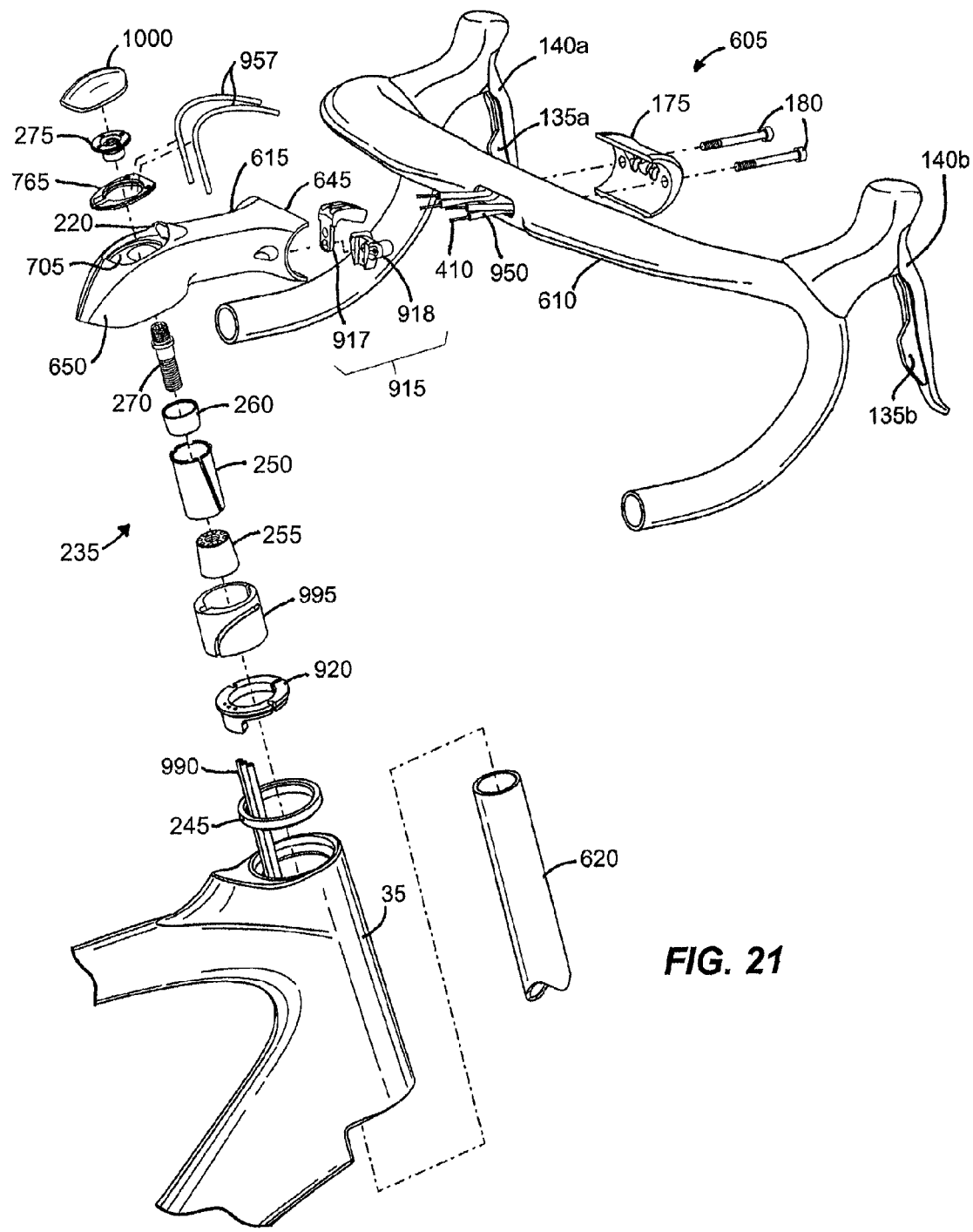
FIG. 21 is an exploded perspective view of a second embodiment of a steering assembly for the bicycle of FIG. 1.
Figure 22:
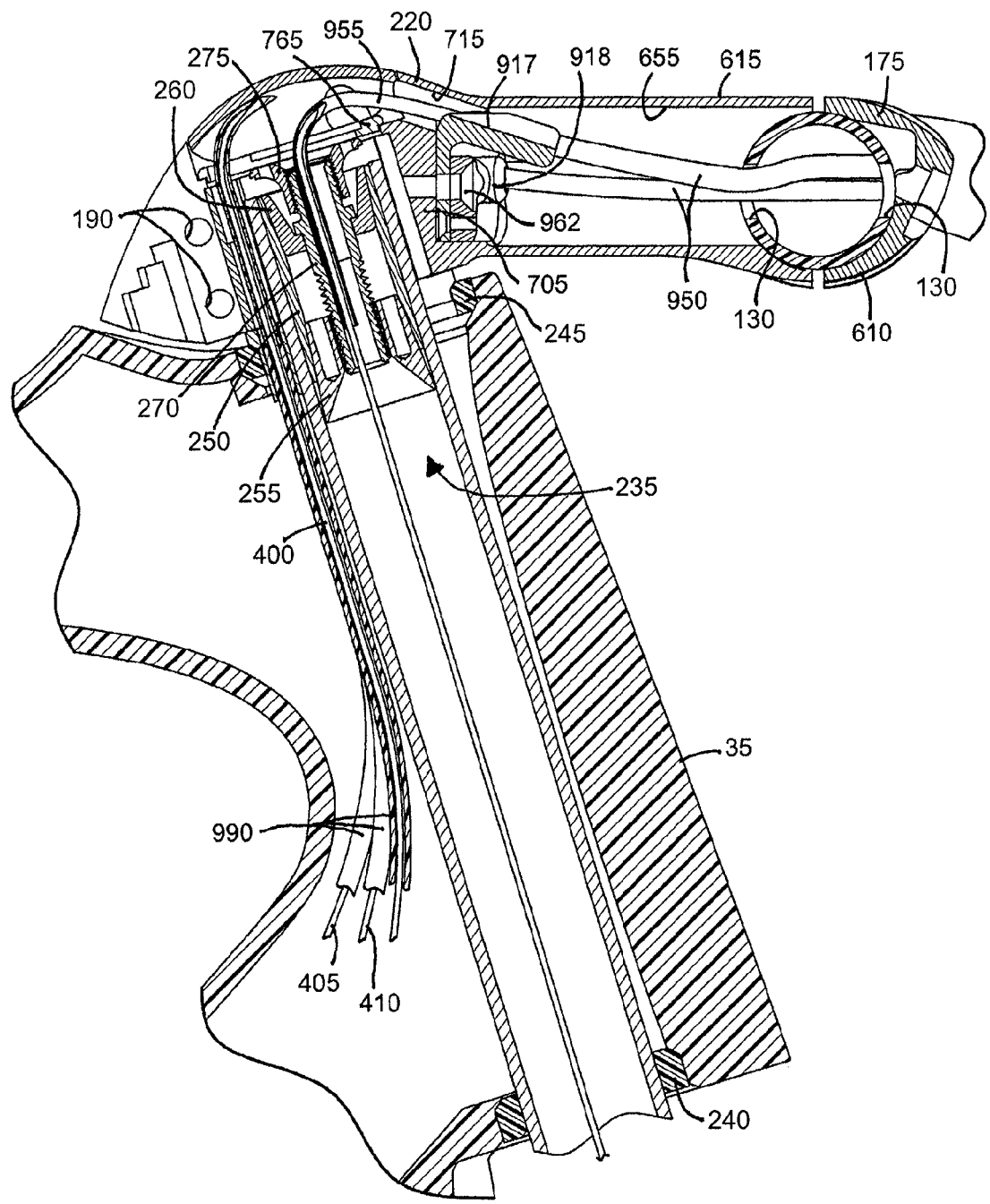
FIG. 22 is a section view of the steering assembly of FIG. 21 and the bicycle frame.
Figure 23:
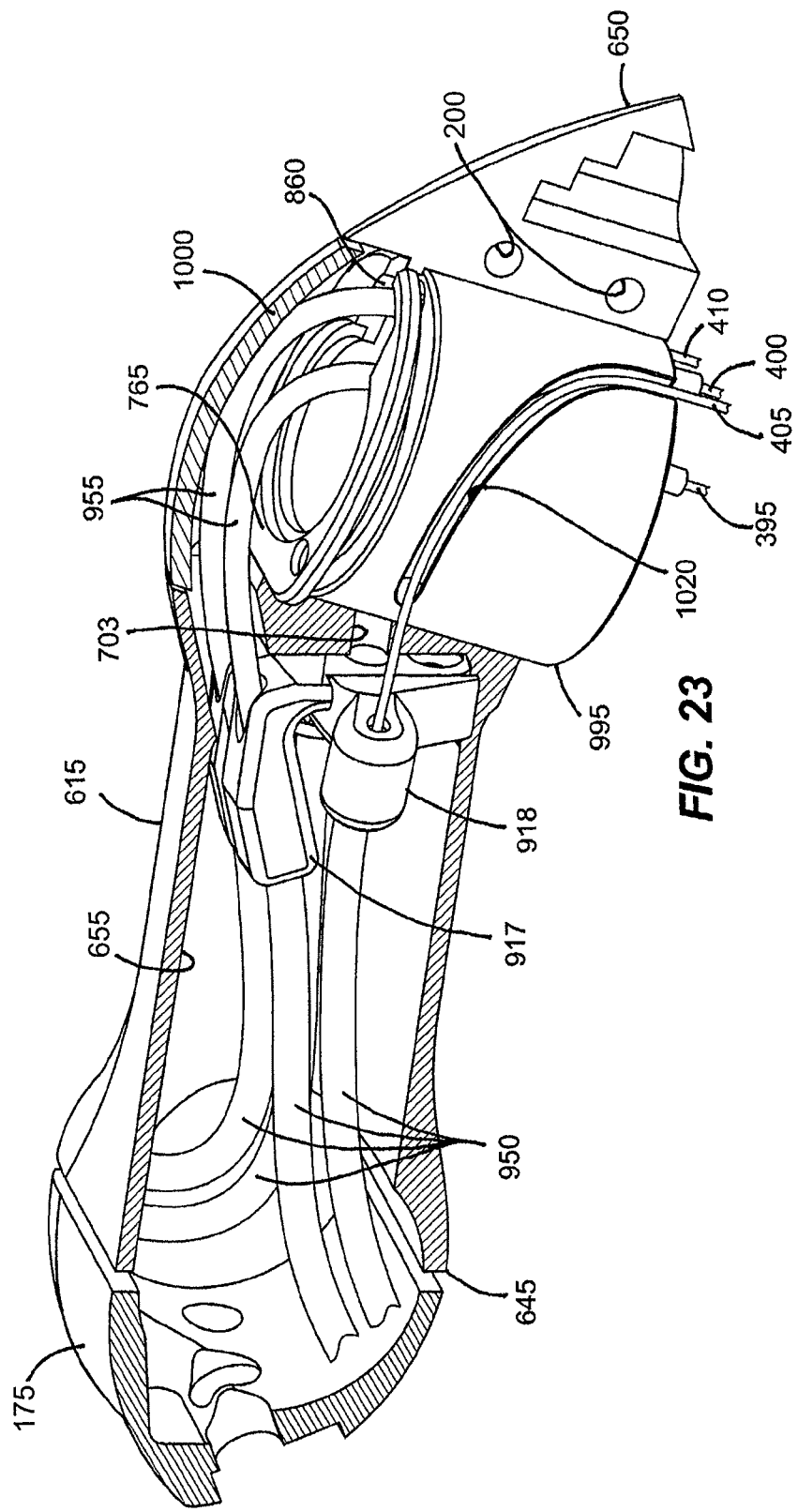
FIG. 23 is a partial section view of a portion of the steering assembly illustrating a cable routing system through the stem.

For example, FIGS. 21-27 illustrate another steering assembly for the bicycle 10. The steering assembly 605 is similar to the steering assembly 105 described with regard to FIGS. 1-20. Referring to FIGS. 21-23, the steering assembly 605 includes a handlebar 610 and a stem 615 that secures the handlebar 610 to a steerer tube 620 of the front fork 35 via a headset 625 such that movement of the handlebar 610 results in movement of the stem 615 and the fork 35. The handlebar 610, and the steerer tube 620 are the same as the handlebar 110 and the steerer tube 120, respectively. As such, these components will not be described in detail.

The stem 615 is similar to the stem 115, and the headset 625 is similar to the headset 125. A difference between the stem 115 and the stem 615 includes a fastener hole 703 that extends into (e.g., through) an internal wall 705 defining the oblong-shaped column that fits over the upper end of the steerer tube 620. The remainder of the stem 615 is the same as the stem 115.

A difference between the headset 625 and the headset 125 includes a cap washer 765 that has a split defined at the back edge of a pocket 860. The cap washer 765 also has a flattened forward profile (i.e. facing the front of the stem 615) compared to the cap washer 265 (e.g., to more easily insert onto a platform 710 of the stem 615).

FIGS. 22 and 23 illustrate a cable routing system that forms part of the steering assembly 605 and that routes the cables 395, 400, 405, 410 from their respective actuators 135, 140 through the steering assembly 605 to their respective termination points. The cable routing system includes a first housing stop assembly 915 that is disposed within the stem 615, and a second housing stop 920 that is coupled to the steerer tube 620. The second housing stop 920 is the same as the second housing stop 420.

Figure 24:
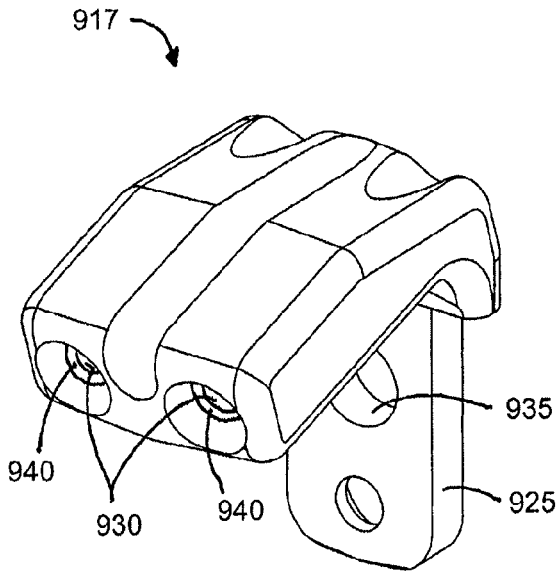
FIG. 24 is a perspective view of a first housing stop portion of the cable routing system of FIG. 23.
Figure 25:
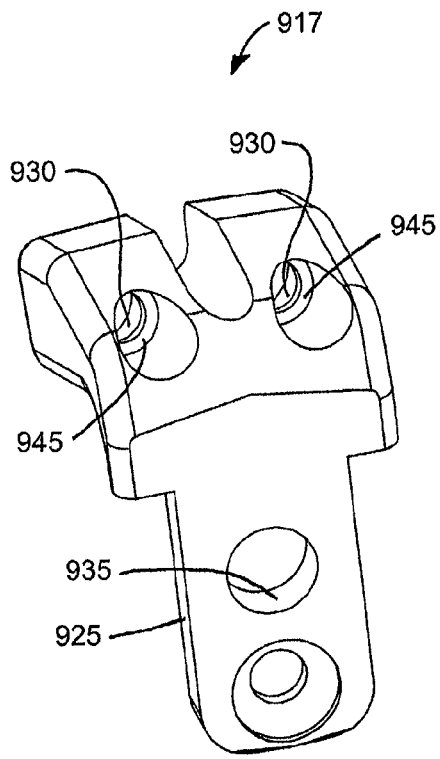
FIG. 25 is another perspective view of the first housing stop portion of the cable routing system of FIG. 23.

Referring to FIGS. 23-25, the first housing stop assembly 915 is attached to the internal wall 705 of the stem 615 and includes a brake housing stop portion 917 and a shift housing stop portion 918. As illustrated, the brake housing stop portion 917 has a tongue or attachment feature 925 that is oriented to engage the internal wall 705 vertically or near-vertically, and brake cable passageways 930 (e.g., two passageways are illustrated). The attachment feature 925 has a hole 935 that is aligned with the hole 703 in the internal wall 705 so that the brake housing stop portion 917 can be secured internally to the stem 615. FIGS. 22 and 24 show that the brake cable passageways 930 extend through an upper part of the brake housing stop portion 917 in a slightly upward (nearly horizontal) direction.

More specifically, the brake cable passageways 930 are aligned with a first passage 715 that are defined in the internal wall 705 and that communicate with the neck portion 655 of the stem 615. Each brake cable passageway 930 has a first countersink 940 disposed on the forward-facing side of the housing stop portion 917 (relative to the forward direction of travel for the bicycle 10), and a second countersink 945 opposite the first countersink 940 and disposed on the rearward-facing side of the housing stop portion 917. First cable housings 955 that extend between the actuators 140 and the brake housing stop portion 917 are engaged with the brake housing stop portion 917 within the first countersinks 950. Stated another way, the first cable housings 950 extend within the interior of the handlebar 610 and terminate at the brake housing stop portion 917 within the first countersinks 940 on the handlebar-side of the housing stop portion 917. Referring to FIGS. 22 and 23, cable conduits 955 extend from the second countersinks 945 through the first passage 715 in the stem 615. The cable conduits 955 can be formed of the same material as the cable housings 950, or another material (e.g., a more flexible material).

Figure 26:
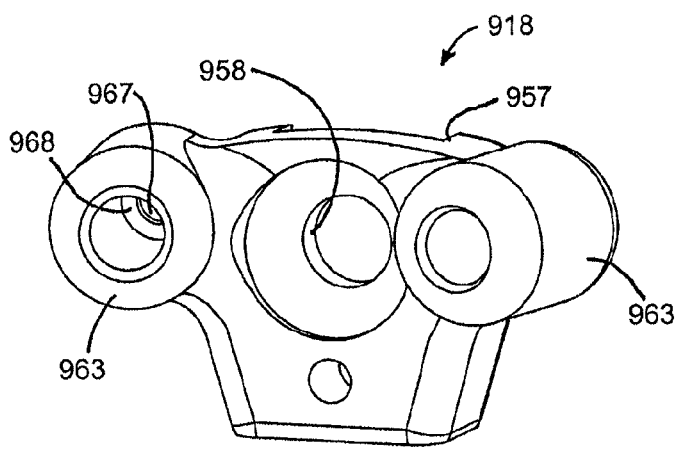
FIG. 26 is a perspective view of a second housing stop portion of the cable routing system of FIG. 23.
Figure 27:
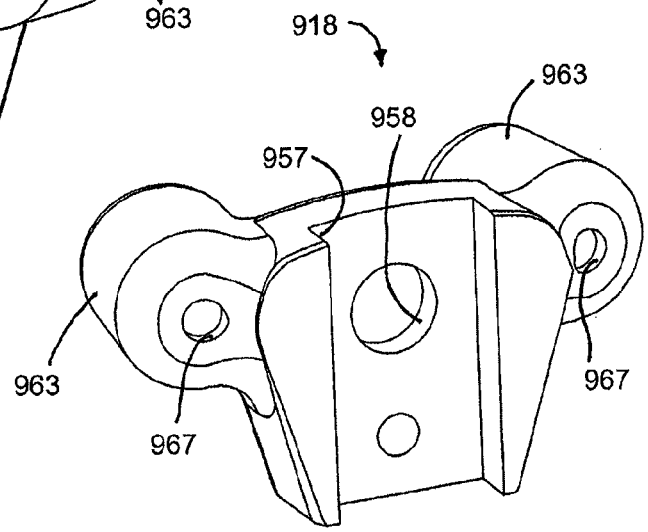
FIG. 27 is another perspective view of the second housing stop portion of the cable routing system of FIG. 23.

FIGS. 26 and 27 show that the shift housing stop portion 918 has a channel or recess 957 that is defined in a central area of the shift housing stop portion 918. The recess 957 is shaped so that the shift housing stop portion 918 fits around (e.g., partially encapsulates) the attachment feature 925 of the brake housing stop portion 917. That is, the attachment feature 925 is coupled to the shift housing stop portion 918 such that the attachment feature 925 is partially nested in or encapsulated by the cable housing stop portion 918. A hole 958 in the central area is aligned with the hole 930 in the attachment feature, and a fastener 962 (FIG. 22) extends through the holes 935, 958 in the housing stop portions 917, 918 and into the hole 703 in the stem 615 to secure the housing stop portions 917, 918 to each other and to the stem 615.

The shift housing stop portion 918 also has extensions 963 that are disposed laterally relative to the central area. Each extension 963 defines a shift cable passageway 967 that is aligned with one second passage 725, which is the same as second passage 225, defined in the internal wall 705. Each shift cable passageway 967 has a third countersink 968 disposed on the forward-facing side of the shift housing stop portion 918 (relative to the forward direction of travel for the bicycle 10). Additional first cable housings 950 that extend between the actuators 135 and the shift housing stop portion 918 are engaged with the shift housing stop portion 918 within the third countersinks 968. Stated another way, the additional first cable housings 950 extend within the interior of the handlebar 610 and terminate at the shift housing stop portion 918 on the handlebar-side of the shift housing stop portion 918.

The cable routing system also includes a second housing stop 920, a spool 995, and a stem cap 1000. The second housing stop 920 and the spool 995 are the same as the second housing stop 420 and the spool 495 described with regard to FIGS. 1-20, and the features of these components are identified by the same reference numerals increased by 500. The stem cap 1000 differs from the stem cap 500 in that the stem cap 1000 is snap-fit onto the stem 615 over the steerer tube 620 without routing cables from the stem 615 to the head tube 30. Instead, the stem cap 1000 cooperates with the cap washer to define a gap through which the cable conduits 955 can extend. The remainder of the cable routing system is the same as the cable routing system described with regard to FIGS. 1-20.

The cables 395, 400, 405, 410 are routed through portions of the steering assembly 605 via the cable routing system as the steering assembly 605 is being assembled. In one example, the front ends (i.e. the ends to be attached to the actuators) of the cables 395, 400, 405, 410 are routed through the respective first and second passages 715, 725 into the stem 615 from the second end 650 to the first end 645 after the first housing stop assembly 915 is attached to the stem 615. As illustrated, the brake cables 395, 400 are routed through the cable conduits 955 from the second end 650, and then through the brake housing stop portion 917. The shift cables 405, 410 are routed through the respective second passages 725 and through the shift housing stop portion 918. From there, the cables 395, 400, 405, 410 are routed into and through the first cable housings 950. The first cable housings 950 can be attached to the first housing stop assembly 915 before or after the cables are routed through the first housing stop assembly 915. If the first cable housings 950 are installed afterward, the housings 950 are slid along the cables 395, 400, 405, 410 into engagement with the first housing stop assembly 915.

Next, the handlebar 610 is positioned adjacent the stem 615 and the front ends of the cables 395, 400, 405, 410 and the respective first cable housings 950 are routed internally through the handlebar 610 to the access points (not shown) for the actuators 135, 140. From there, the cables 395, 400, 405, 410 can be operably coupled to the respective actuators 135, 140. The handlebar 610 is attached to the stem 615, and then the cables 395, 400, 405, 410 and the respective housings 950 can be routed to the actuator access points.

With reference to FIGS. 22 and 23, the brake cables 395, 400 are routed through the central part of the spool 995, and the shift cables 405, 410 are routed from through the internal wall 705 into arcuate channels 1020 disposed on the outer side of the spool 995. The cable conduits facilitate routing of the brake cables 395, 400 through the second end 650 of the stem 615 along the head tube 30 (inside or outside the steerer tube 620). The cable conduit 955 for the rear brake cable 400 terminates at the second housing stop 920, and the cable conduit 955 for the front brake cable 395 terminates at a location within the steerer tube 620 (e.g., at the bottom of the steerer tube 620). The front brake cable 395 and the associated cable conduit 955 can be routed through the cap washer 765 and inside the preload bolt 270 generally downward to the front brake 95 through the steerer tube 620 before or after the stem 615 is secured to the steerer tube 620. The remainder of the cable routing through the steering assembly 605 and the remainder of the assembly of the components of the steering assembly 605 are the same as the cable routing and assembly described with regard to FIGS. 1-20.

When the steering assembly 605 is fully assembled, each cable 395, 400, 405, 410 is routed from the corresponding actuator 135, 140 internally through one of the first cable housings 950 within the handlebar 610 to the first housing stop assembly 915. As illustrated, the portion of the front and rear brake cables 395, 400 extending from the brake housing stop portion 917 to the head tube 30 are housed in cable conduits 955, whereas the section of the shift cables 405, 410 between the shift housing stop portion 918 and the second housing stop 920 are exposed (i.e. routed through the steering assembly 605 without a cable housing or cable conduit, or not covered by a housing).

The cable housings in the handlebar 110, 610 and in the head tube 30 facilitate cable routing through the steering assembly 105, 605. The portions of the cables 395, 400, 405, 410 that are exposed (e.g., in the stem 115 and between the first and second housings stops 415, 420) permit a user to alter the length of the stem 115, the length of the steerer tube 120, or both lengths, to suit a preferred rider profile without having to modify the lengths of the cable housings 455, 490. In other words, the cable routing system described and illustrated with regard to FIGS. 1-20 has cable housings 455, 490 that do not need to be changed when the cables 395, 400, 405, 410 are changed (i.e. the lengths of the cable housings 455, 490 stay the same). The housing stops 415, 420 make it possible to install the cable routing system one time and to make changes to rider setup by only changing the lengths of the cables affected.

Similarly, the cable routing system described and illustrated with regard to FIGS. 21-27 has second cable housings 990 that do not need to be changed when the height of the stem 615 is adjusted. That is, the stem 615 can be raised (e.g., using a taller steerer tube) simply by changing the lengths of the cables 395, 400, 405, 410 without having to alter the lengths of the cable housings 990 (i.e. the lengths of the cable housings 990 stay the same). In the event that the stem 615 is replaced by a longer stem, the length of the first cable housings 950 will change and the second cable housings 990 will remain the same length. The housing stops make it possible to install most, if not all, of the cable routing system one time and to make changes to rider setup by only changing the lengths of the cables affected.

A third embodiment of the invention is illustrated in FIGS. 28-34. In the third embodiment, the front brake cable is routed through a steering assembly in a manner that is different from what is illustrated in FIGS. 1-27. More specifically, rather than routing the front brake cable through the center of the steerer tube, the front brake cable passes through the steerer tube in an offset or non-centered position, as described below in more detail.

Figure 28:
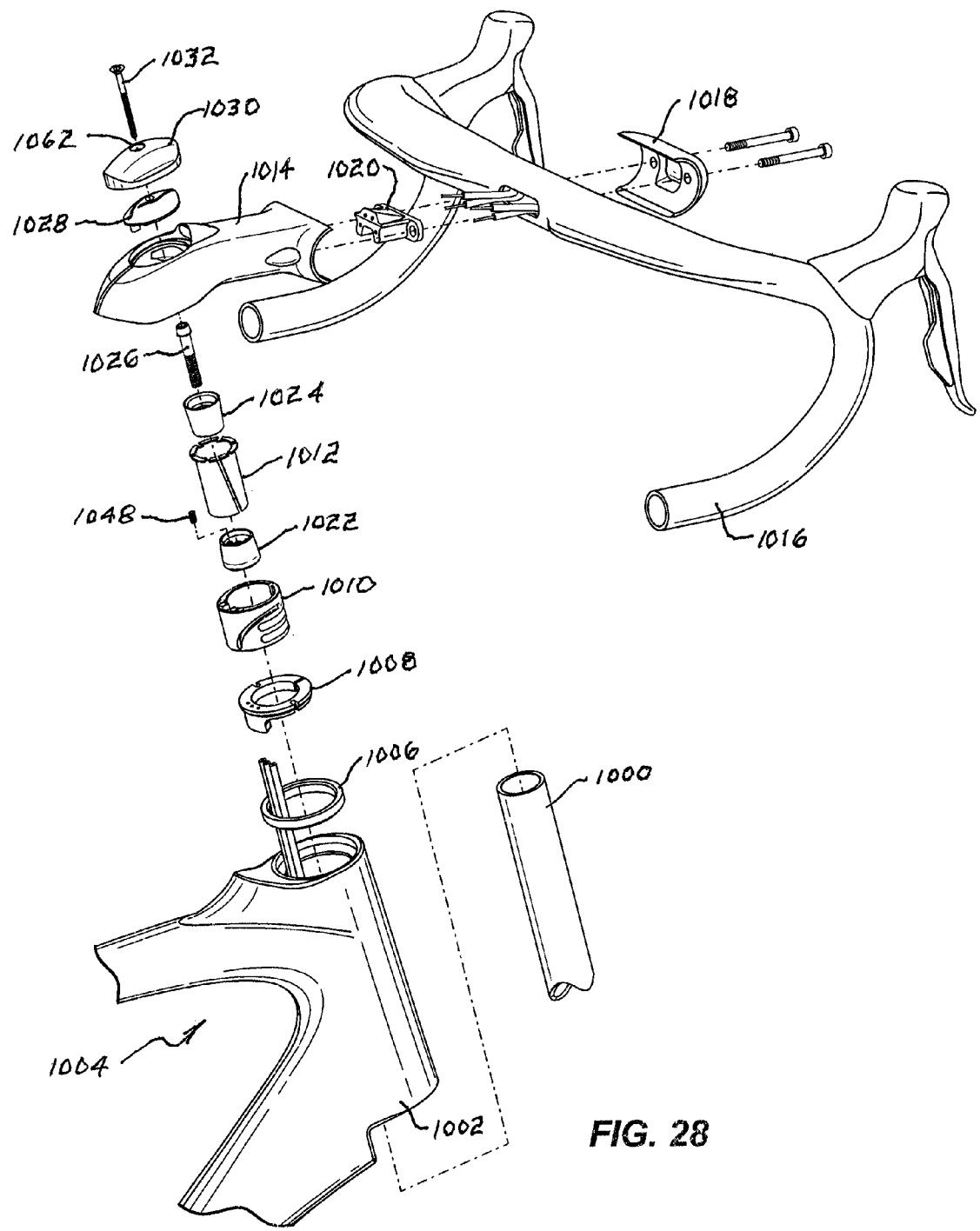
FIG. 28 is an exploded perspective view of a third embodiment of a steering assembly for the bicycle of FIG. 1.
Figure 29:
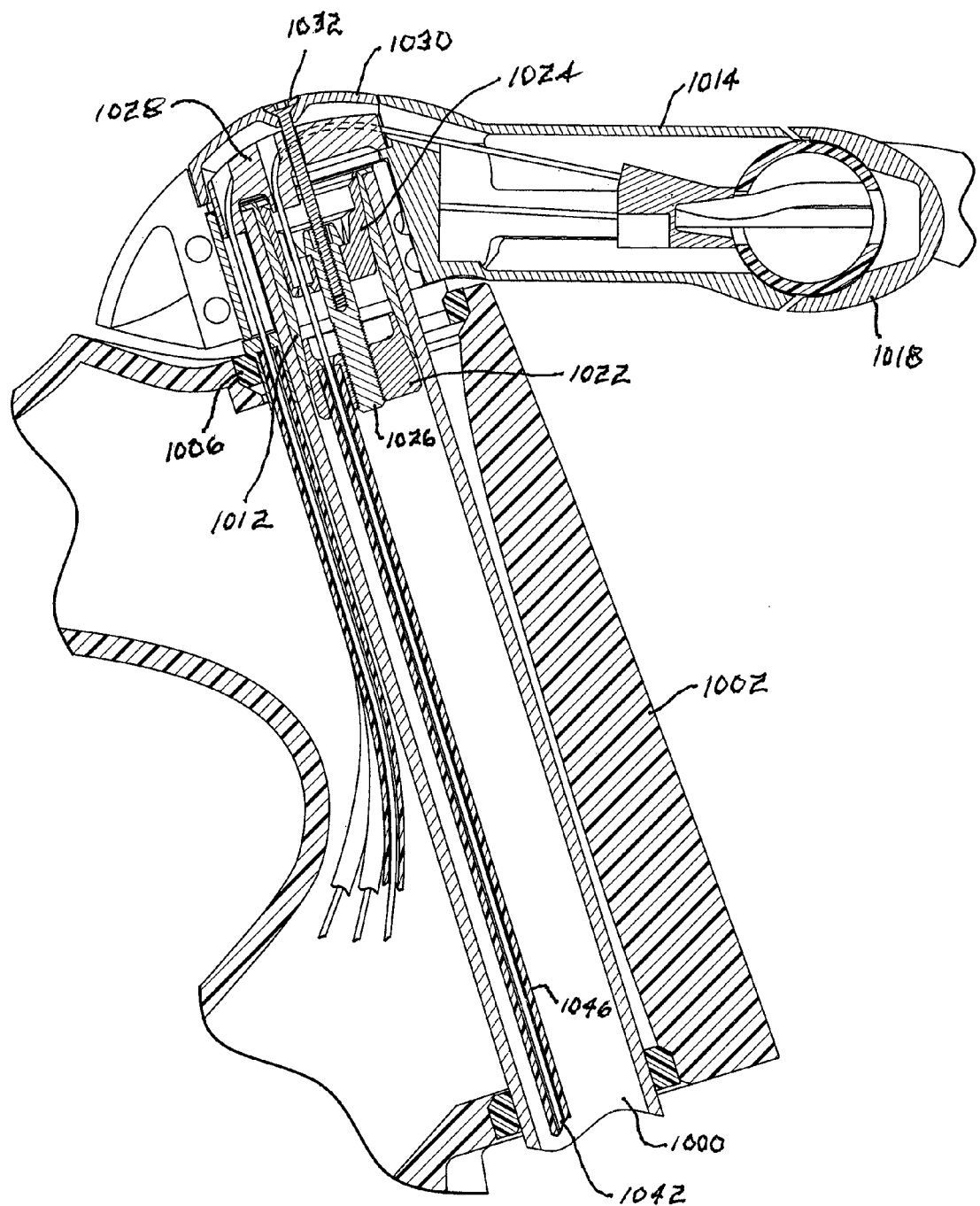
FIG. 29 is a longitudinal, vertical section view taken along line 29-29 in FIG. 28 with the parts assembled.

Referring to FIG. 28, the third embodiment is designed to secure a steerer tube 1000 to a head tube 1002 of a bicycle frame 1004. The key parts that are the same or similar to the first embodiment include an upper headset bearing 1006, a second housing stop 1008, a spool 1010, a sleeve 1012, a stem 1014, handlebars 1016, a faceplate 1018, and a first housing stop 1020. None of these parts will be described in detail in this third embodiment. The main differences are to a first cone 1022, a second cone 1024, a wedge bolt 1026 (previously referred to as a preload bolt), a stem cap 1028, a top cap 1030, and a preload screw 1032.

Figure 30:
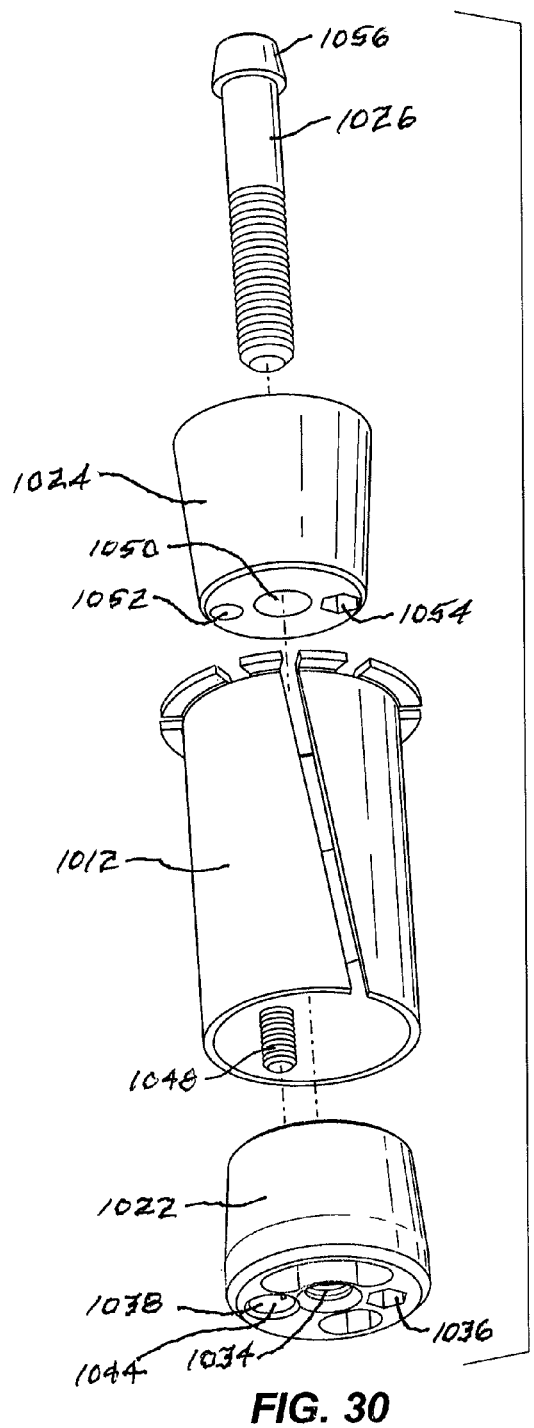
FIG. 30 is an exploded perspective view of a wedge assembly of the cable routing system of FIG. 28.
Figure 31:
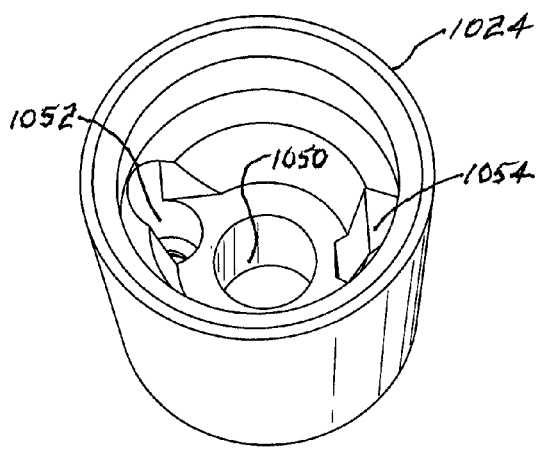
FIG. 31 is a perspective view of an upper cone of the cable routing system of FIG. 28.
Figure 32:
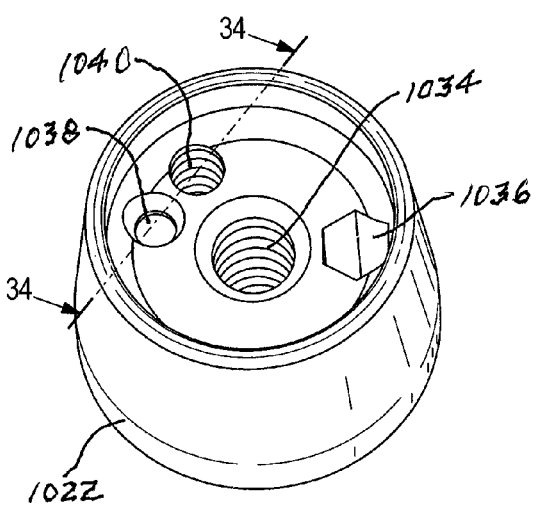
FIG. 32 is a upper perspective view of a lower cone of the cable routing system of FIG. 28.
Figure 34:
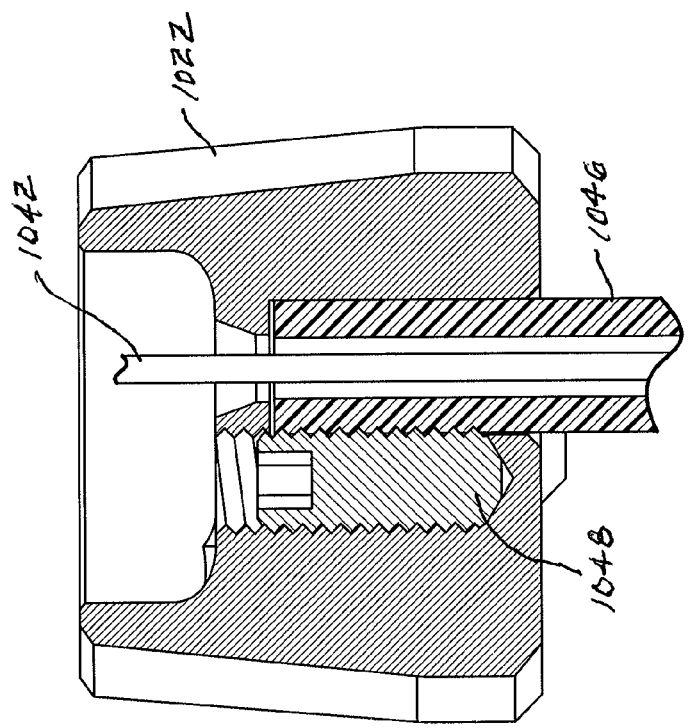
FIG. 34 is an enlarged section view of the lower cone of the cable routing system taken along line 34-34 in FIG. 32.
Figure 33:
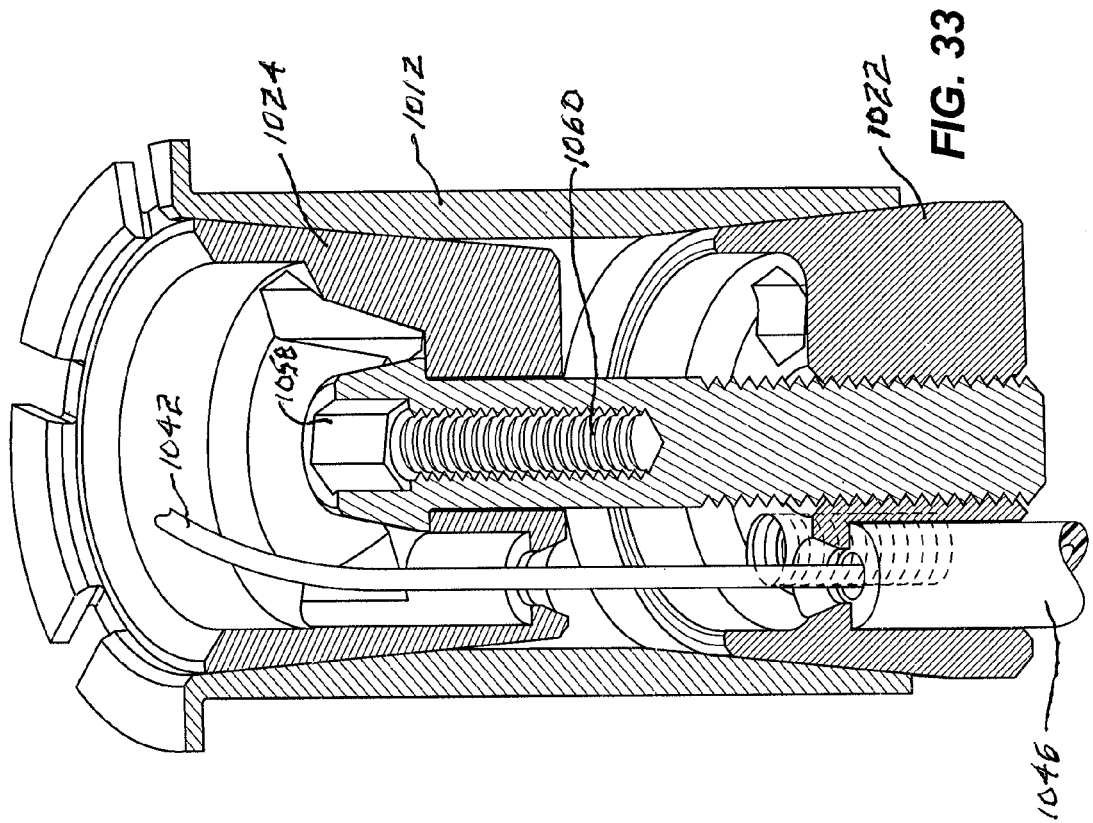
FIG. 33 is an enlarged section view the wedge assembly of the cable routing system of FIG. 28.

Referring to FIGS. 30-32, the first or lower cone 1022 includes a threaded central opening 1034 for receiving the wedge bolt 1026, an offset lower hex opening 1036, an offset lower cable opening 1038, and an offset threaded retainer passageway 1040. The lower cable opening 1038 is sized on its upper end to facilitate a brake cable 1042 sliding therethrough. A lower end of the lower cable opening 1038 includes a countersunk portion 1044 with a larger diameter that is sized to receive a brake cable housing 1046. In this regard, the lower cone 1022 acts as a third housing stop. A radially outer edge of the retainer passageway 1040 overlaps with the countersunk portion 1044 of the lower cable opening 1038. Referring to FIGS. 33-34, a threaded retainer 1048 is designed to be threaded into the retainer passageway 1040 so that the threads of the threaded retainer 1048 engage with a brake cable housing 1046 positioned in the countersunk portion 1044 of the lower cable opening 1038 to thereby secure the brake cable housing 1046 in place and in engagement with the lower cone 1022.

The second or upper cone 1024 includes a central bore 1050 for receiving the wedge bolt 1026 in a sliding relationship, an offset upper cable opening 1052, and an offset upper hex opening 1054. The upper cable opening 1052 is sized to facilitate a brake cable 1042 sliding therethrough.

The wedge bolt 1026 include a head 1056 having a hex socket 1058 in its upper end to facilitate turning of the wedge bolt 1026 with a hex wrench (not shown). The wedge bolt 1026 further includes a threaded socket 1060 inboard of the hex socket 1058.

With the upper and lower cones 1024,1022 positioned in opposing ends of the sleeve 1012 (and preferably with the brake cable housing 1046 secured in place by the threaded retainer 1048, as described above), the wedge bolt 1026 is designed to be inserted through the central bore 1050 of the upper cone 1024 and threaded into the central opening 1038 of the lower cone 1022 to create a wedge assembly. The wedge assembly is designed to be inserted into an upper end of the steerer tube 1000 and secured in place by tightening the wedge bolt 1026. An appropriately sized hex wrench can be inserted into the upper and lower hex openings 1054,1036 in order to maintain a desired alignment of the upper and lower cable openings 1052,1038 while the wedge bolt 1026 is being tightened.

After the wedge assembly is in place, the stem cap 1028 is positioned over the stem 1014 and the various cables can be routed as desired. For example, the front brake cable 1042 will be passed from the stem 1014, through the appropriate grooves or passageways in the stem cap 1028 and down through the upper and lower cable openings 1052,1038 in the upper and lower cones 1024,1022, respectively. The top cap 1030 is them placed over the stem cap 1028 and into engagement with the stem 1014. The preload screw 1032 is then inserted through an upper opening 1062 in the top cap 1030 and threaded into the threaded socket 1060 in the wedge bolt 1026. The preload screw 1032 is then used to set the desired preload on the headset bearings, as is generally known in the art.

Various features and advantages of the invention are set forth in the following claims.

The invention claimed is:

1. A steering assembly for a bicycle including a frame having a head tube and a headset bearing, the steering assembly comprising:
   a fork including a steerer tube;
   a stem coupled to the steerer tube;
   a handlebar coupled to the stem and configured to support an actuator;
   a housing stop positioned in the stem or in the steerer tube;
   a cable housing coupled to the housing stop; and
   a cable adapted to be coupled to the actuator to control a bicycle component, the cable routed through the housing stop and within the steerer tube,
   wherein the cable on one side of the housing stop is enclosed by the cable housing, and
   wherein at least a portion of the cable on the other side of the housing stop is exposed.

2. The steering assembly of claim 1, wherein the cable is further routed within one or both of the handlebar and the stem.

3. The steering assembly of claim 1, wherein the housing stop is coupled to the steerer tube, and wherein the cable housing is positioned within the steerer tube and terminates at the housing stop.

4. The steering assembly of claim 1, wherein the housing stop is coupled to the stem, and wherein the cable housing is configured to extend from the actuator and terminates at the housing stop.

5. The steering assembly of claim 1, further comprising a preload assembly positioned in the steerer tube and configured to cooperate with a preload screw to preload a headset bearing, wherein the cable extends through the preload assembly.

6. The steering assembly of claim 1, wherein the cable housing is secured to the housing stop by a threaded retainer.

7. The steering assembly of claim 1, wherein the cable includes a brake cable.

8. A steering assembly for a bicycle including a frame having a head tube and a headset bearing, the steering assembly comprising:
   a fork including a steerer tube defining a steering axis;
   a stem coupled to the steerer tube;
   a handlebar coupled to the stem and configured to support an actuator;
   a preload assembly positioned in the steerer tube and configured to preload the headset bearing, the preload assembly defining an axial opening on the steering axis; and
   a cable coupled to the actuator to control a bicycle component, the cable routed through the preload assembly within the steerer tube,
   wherein at least a portion of the cable routed through the preload assembly is exposed.

9. The steering assembly of claim 8, wherein the preload assembly includes a first cone and a second cone each defining a central bore forming a portion of the axial opening, and a wedge bolt extending through the central bore of the second cone and into the central bore of the first cone to secure the first and second cones together, and a preload screw coupled to the preload assembly to preload the headset bearing.

10. The steering assembly of claim 9, wherein the preload assembly defines an offset opening laterally offset from the axial opening, and wherein the first cone defines a housing stop and the steering assembly further includes a cable housing terminating at the housing stop and aligned with the offset opening.

11. The steering assembly of claim 10, wherein the first cone further defines a retainer passageway located adjacent the offset opening, and wherein a retainer is threadably received within the retainer passageway and is engaged with the cable housing to secure the cable housing to the first cone.

12. The steering assembly of claim 11, wherein the retainer passageway overlaps the offset opening of the first cone.

13. The steering assembly of claim 9, wherein the first cone defines a first opening and the second cone defines a second opening, and wherein the first and second openings are configured to receive a tool to align the second cone with the first cone.

14. A bicycle comprising:
   a frame including a head tube;
   a headset bearing coupled to the head tube;
   a fork rotationally coupled to the frame within the head tube and including a steerer tube;
   a wheel rotationally coupled to the fork;
   a stem coupled to the steerer tube;
   a handlebar coupled to the stem for steering the wheel, the handlebar supporting an actuator adapted to control a bicycle component;
   a housing stop coupled to the steerer tube and rotatable with the steerer tube;
   a cable housing disposed in the head tube and terminating at the housing stop; and
   a cable coupled to the actuator and routed internally through the cable housing within the head tube.

15. The bicycle of claim 14, wherein the cable is further routed within one or both of the handlebar and the stem.

16. The bicycle of claim 14, wherein the housing stop is coupled to an upper end of the head tube and is positioned between the headset bearing and the steerer tube, and wherein the cable extends through the cable housing along an exterior of the steerer tube.

17. The bicycle of claim 14, wherein the housing stop is positioned inside the steerer tube, wherein at least a portion of the cable extends through the steerer tube within the cable housing.

18. The bicycle of claim 17, wherein a portion of the cable within the steerer tube extends through the cable housing, and wherein a portion of the cable within the steerer tube is exposed.

19. The bicycle of claim 14, further comprising a preload assembly positioned in the steerer tube and configured to cooperate with a preload screw to preload the headset bearing, wherein the cable extends through the preload assembly.

20. The bicycle of claim 19, wherein the preload assembly includes the housing stop, wherein the housing stop includes a central bore and an offset opening, and wherein the cable is routed through the housing stop within the offset opening.

* * * * *